(12) United States Patent
Guha

(10) Patent No.: US 11,571,837 B2
(45) Date of Patent: Feb. 7, 2023

(54) PROCESS OF MAKING A FIBER PREFORM OF COMMINGLED FIBER BUNDLE FOR OVERMOLDING

(71) Applicant: Probir Kumar Guha, Bloomfield Hills, MI (US)

(72) Inventor: Probir Kumar Guha, Bloomfield Hills, MI (US)

(73) Assignee: Coats Group PLC, Uxbridge (GB)

( * ) Notice: Subject to any disclaimer, the term of this patent is extended or adjusted under 35 U.S.C. 154(b) by 526 days.

(21) Appl. No.: 16/733,702

(22) Filed: Jan. 3, 2020

(65) Prior Publication Data
US 2020/0139584 A1    May 7, 2020

Related U.S. Application Data

(63) Continuation-in-part of application No. PCT/IB2018/000854, filed on Jul. 5, 2018.
(Continued)

(51) Int. Cl.
*B29B 11/16*    (2006.01)
*B29C 70/54*    (2006.01)
(Continued)

(52) U.S. Cl.
CPC .............. *B29B 11/16* (2013.01); *B29B 11/12* (2013.01); *B29C 70/42* (2013.01); *B29C 70/48* (2013.01); *B29C 70/541* (2013.01); *B29C 70/543* (2013.01); *B32B 5/024* (2013.01); *B32B 5/26* (2013.01); *B32B 7/09* (2019.01);
(Continued)

(58) Field of Classification Search
CPC ............ D10B 2505/02; D10B 2101/12; D10B 2101/06; B29L 2031/30; D04H 13/00; B32B 5/024; B29C 70/42
See application file for complete search history.

(56) References Cited

U.S. PATENT DOCUMENTS

| 8,303,743 | B2* | 11/2012 | Youn ....................... B32B 27/12 |
| | | | 156/181 |
| 2009/0050259 | A1 | 2/2009 | Joern et al. |
| 2013/0230716 | A1* | 9/2013 | Schmidt ..................... C08J 5/24 |
| | | | 428/221 |

FOREIGN PATENT DOCUMENTS

| WO | 2002-45932 A1 | 6/2002 |
| WO | 2007-010052 A1 | 1/2007 |

(Continued)

OTHER PUBLICATIONS

Int'l. Search Report for PCT/IB2018/000854, dated Dec. 17, 2018.

*Primary Examiner* — Vishal I Patel
(74) *Attorney, Agent, or Firm* — Blue Filament Law PLLC

(57) ABSTRACT

A process of forming the fiber preform includes providing a substrate, applying a first layer of a fiber bundle to the substrate in a predetermined pattern having a principal orientation, stitching the first layer of the fiber bundle to the substrate using a thread, building up subsequent layers of the fiber bundle from the first layer, and stitching each of the subsequent layers to a preceding layer using the thread. A process of forming a unitary reinforced composite material includes the fiber preform. The process of forming a unitary reinforced composite component includes placing the fiber preform a mold platen, heating the perform to promote fusion of the thermoplastic fibers therein, cooling the perform until solidified with contours of the component, and removing the vehicle component from the mold platen.

19 Claims, 44 Drawing Sheets

Related U.S. Application Data

(60) Provisional application No. 62/592,481, filed on Nov. 30, 2017, provisional application No. 62/592,493, filed on Nov. 30, 2017, provisional application No. 62/548,155, filed on Aug. 21, 2017, provisional application No. 62/540,771, filed on Aug. 3, 2017, provisional application No. 62/540,830, filed on Aug. 3, 2017, provisional application No. 62/528,685, filed on Jul. 5, 2017, provisional application No. 62/528,658, filed on Jul. 5, 2017.

(51) Int. Cl.
| | |
|---|---|
| *B32B 7/09* | (2019.01) |
| *B29C 70/42* | (2006.01) |
| *B32B 5/02* | (2006.01) |
| *B32B 5/26* | (2006.01) |
| *D03D 11/00* | (2006.01) |
| *D04H 13/00* | (2006.01) |
| *B29B 11/12* | (2006.01) |
| *B29C 70/48* | (2006.01) |
| *C08J 5/24* | (2006.01) |
| *B29C 70/08* | (2006.01) |
| *B29C 70/68* | (2006.01) |
| *B29K 101/12* | (2006.01) |
| *B29K 309/08* | (2006.01) |
| *C08J 5/04* | (2006.01) |
| *B29L 31/30* | (2006.01) |
| *B29K 301/12* | (2006.01) |

(52) U.S. Cl.
CPC .............. *C08J 5/243* (2021.05); *D03D 11/00* (2013.01); *D04H 13/00* (2013.01); *B29C 70/08* (2013.01); *B29C 70/68* (2013.01); *B29K 2101/12* (2013.01); *B29K 2301/12* (2013.01); *B29K 2309/08* (2013.01); *B29L 2031/30* (2013.01); *B32B 2260/023* (2013.01); *B32B 2260/046* (2013.01); *C08J 5/042* (2013.01); *D10B 2101/06* (2013.01); *D10B 2101/12* (2013.01); *D10B 2331/021* (2013.01); *D10B 2401/041* (2013.01); *D10B 2505/02* (2013.01)

(56) References Cited

FOREIGN PATENT DOCUMENTS

| | | | |
|---|---|---|---|
| WO | 2015-157175 A1 | 10/2015 | |
| WO | WO-2015157175 A1 * | 10/2015 | ............ B29B 11/04 |

* cited by examiner

PROCESS OF MAKING A FIBER PREFORM OF COMMINGLED FIBER BUNDLE FOR OVERMOLDING

RELATED APPLICATIONS

This application is a continuation in part of PCT Application Serial Number PCT/IB2018/000854, filed Jul. 5, 2018, which in turn claims priority benefit of U.S. Provisional Application Ser. No. 62/528,685 filed on Jul. 5, 2017; 62/528,658 filed on Jul. 5, 2017; 62/540,771 filed on Aug. 3, 2017; 62/540,830 filed on Aug. 3, 2017; 62/548,155 filed on Aug. 21, 2017; 62/592,493 filed on Nov. 30, 2017; 62/592,481 filed on Nov. 30, 2017.

FIELD OF THE INVENTION

The present invention in general relates to preforms for composite components and in particular to sewn reinforced fiber preforms, and a method of construction thereof based on thermoset resin overmolding of the preform.

BACKGROUND OF THE INVENTION

Weight savings in the automotive, transportation, and logistics based industries has been a major focus in order to make more fuel-efficient vehicles both for ground and air transport. In order to achieve these weight savings, light weight composite materials have been introduced to take the place of metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for many reasons: common examples include materials which are stronger, lighter, or less expensive when compared to traditional materials.

Composite materials are engineered or naturally occurring materials made from two or more constituent materials with significantly different physical or chemical properties which remain separate and distinct at the macroscopic or microscopic scale within the finished structure. There are two categories of constituent materials: matrix and reinforcement. At least one portion of each type is required. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination.

The use of fiber and particulate inclusions to strengthen a matrix is well known in the art. Well established mechanisms for the strengthening include slowing and elongating the path of crack propagation through the matrix, as well as energy distribution associated with pulling a fiber free from the surrounding matrix material. Liquid composite molding (LCM) and resin transfer molding (RTM) involve enveloping a preform structure in a thermoset resin matrix. The curable thermoset resin is used both neat and loaded with reinforcing particulate and fiber fillers. The preform can add strength to the resulting vehicle component, lower the overall density thereof through inclusion of a void volume, or a combination thereof.

There is a growing appreciation in the field of molding compositions that replacing in part, or all of the glass fiber in molding compositions with carbon fiber can provide improved component properties. However, the relative cost of carbon fiber relative to glass has slowed the acceptance of such preforms in the automotive, heavy truck, farm equipment, and earth moving equipment mass markets. Yet, the use of carbon fibers in composites, sheet molding compositions, and resin transfer molding (RTM) results in formed components with a lower weight as compared to glass fiber reinforced materials. The weight savings achieved with carbon fiber reinforcement stems from the fact that carbon has a lower density than glass and produces stronger and stiffer parts at a given thickness.

An additional hindrance to mass production of composite components and in particular vehicle components with LCM or RTM is the inefficiency of preform production and the scrap produced by providing cutouts or modification of the preform prior to molding. Preform formation by compressing chopped fibers relative to a preform mold is a comparatively slow process and the resulting perform is difficult to handle.

Preforms are currently formed by laying up layers of woven fabric that are cut to a desired shape. The cut sheets are then laid into a mold by hand and either the mold closed before thermoset curable resin injection into the mold (RTM) or after liquid composite molding (LCM). The current process for forming a preform is slow and prone to error in placement either through operator limitations or movement with resin flow as the resin is introduced or cured.

Thus, there exists a need for a more efficient method for forming a novel preform produced through the selective stitching of commingled fiber bundles to form a multilayer preform.

SUMMARY OF THE INVENTION

A process of forming the fiber preform includes providing a substrate, applying a first layer of a fiber bundle to the substrate in a predetermined pattern having a principal orientation, stitching the first layer of the fiber bundle to the substrate using a thread, building up subsequent layers of the fiber bundle from the first layer, and stitching each of the subsequent layers to a preceding layer using the thread. The fiber preform includes a substrate, a fiber bundle having one or more types of reinforcing fibers, and a thread. The fiber bundle is arranged on the substrate and attached to the substrate by a plurality of stitches of the thread to form a first preform layer having a principal orientation.

A process of forming a unitary reinforced composite material includes the fiber preform. The process of forming a unitary reinforced composite component includes placing the fiber preform a mold platen, heating the perform to promote fusion of the thermoplastic fibers therein, cooling the perform until solidified with contours of the component, and removing the vehicle component from the mold platen.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1A:
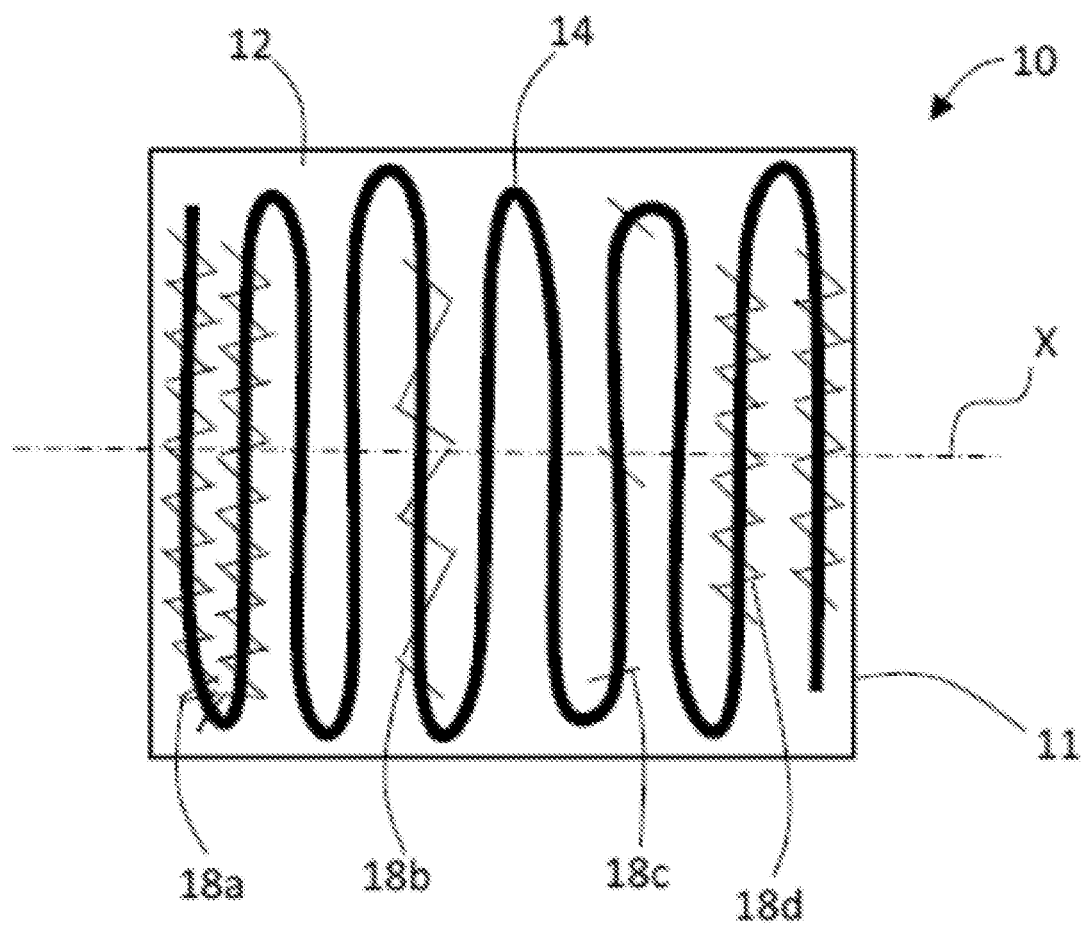
FIG. 1A is a schematic view of a reinforcement fiber bundle stitched to a substrate forming a fiber preform according to one embodiment of the present invention.

The present invention has utility as a fiber preform of a light-weight, high-strength composite material and a process of creating the such performs by sewing a fiber bundle into desired preform shapes. Embodiments of the inventive preform may be formed using selective commingled fiber bundle positions (SCFBP). According to some embodiments, the fiber bundle includes only reinforcing fiber with no thermoplastic based fibers (e.g., nylon) in the selectively placed commingled fiber bundle. In further embodiments, the fiber bundle includes both reinforcing fibers and matrix fibers, such as thermoplastic based fibers. Embodiments of the inventive preform may be multi-layered and need not have complete layers.

The reinforcing fibers used in embodiments of the preform are either 100% carbon fiber, 100% glass fiber, 100% aramid, or a combination of at least two of preceding reinforcing fibers. According to certain embodiments, the fiber bundle 14 includes matrix fibers in addition to the reinforcing fibers. The matrix fibers being of a thermofusible nature may be formed from a thermoplastic material such as, for example, polypropylenes, polyamides, polyesters, polyether ether ketones, polybenzobisoxazoles, polyphenylene sulfide; block copolymers containing at least of one of the aforementioned constituting at least 40 percent by weight of the copolymer; and blends thereof. The thermoplastic fibers are appreciated to be recycled, virgin, or a blend thereof. The thermofusible thermoplastic matrix fibers have a first melting temperature at which point the solid thermoplastic material melts to a liquid state. The reinforcing fibers may also be of a material that is thermofusible provided their thermofusion occurs at a temperature which is higher than the first melting temperature of the matrix fibers so that, when both fibers are used to create a composite, at the first melting temperature at which thermofusibility of the matrix fibers occurs, the state of the reinforcing fibers is unaffected.

According to some embodiments, the thread used to retain the fiber bundle is a thermoplastic thread, such as nylon. In other embodiments, the thread is a non-melt material such as a glass fiber thread, a carbon fiber thread, an aramid fiber thread, a metal wire, to provide additional strength to the preform. As used herein, the term melting as used with respect to thermoplastic fibers or thread is intended to encompass both thermofusion of fibers such that a vestigial core structure of separate fibers is retained, as well as a complete melting of the fibers to obtain a homogenous thermoplastic matrix.

The substrate used to secure the fiber bundle attached with the thread may be retained or removed prior to mold placement. Once formed, the preform is then infiltrated with curable resin and cured as is conventional by either RTM, LCM, thermoplastic overmolding, injection molding, or the like. By setting an approximate three-dimensional (3D) shape of a fiber preform prior to insertion in a mold, the resulting vehicle component quality and throughput are enhanced while reducing product waste and human manipulation. The fusion of the stitching and/or additional tac points throughout the fiber preform in the SCFBP preform is sufficient to retain the 3D shape of the preform needed for enhanced RTM, LCM, thermoplastic overmolding, or injection molding.

Embodiments of the inventive perform speed up the preform formation process and provide for more uniform parts. Furthermore, the ability to keep all the fibers in the fiber bundle parallel (in a weave only half are parallel in first direction and other half are perpendicular) positively affects the strength of a part formed with an embodiment of the preform. In addition, waste is reduced by eliminating the need to cut sheets to form the preform.

Embodiments of the inventive perform, formed with continuous fiber bundles are stronger than those produced from chopped fibers. Additionally, as SCFBP can use automated sewing machines, the speed and reproducibility are high compared to chopping fibers and formed preforms therefrom, while retaining the light weight of such preforms compared to metal preforms. Various composite components illustratively including vehicle components are prepared with resort to selective commingled fiber bundle positioning (SCFBP) to selectively place co-mingled fibers that are enriched in carbon fiber as a reinforcement relative to other region that rely on a relatively higher percentage of glass fiber reinforcement to create such a preform. In specific inventive embodiments commingled fibers of glass, carbon, and aramid are used to form a yarn that has predictable strength, and where the ratio of different fiber types is varied to create different properties along a given length. The commingled fiber based yarn may be used in the formation of the SCFBP preforms, and are able to be embroidered directly into complex shapes thereby eliminating trimming waste and inefficient usage of comparatively expensive carbon fiber. In specific inventive embodiments, SCFBP preforms include from 3 to 20 layers that vary in fiber types in three dimensions (3D). It is appreciated that number of layers can be increased beyond 20 and is limited only by the ability to sew through preceding layers. Additionally, as SCFBP is based on successive layer build up, new shapes of preforms can be developed relative to chopped fiber preforms. As SCFBP is analogous to three-dimensional printing, voids are readily formed by a successive layer being stitched to a substrate with a void therebetween by not compressing a fiber bundle to the substrate. Regardless of the shape the preform, the preform is then overlayered with one or more of a woven or nonwoven fabric sheet. The fabric sheet being formed from thermoplastic fibers, glass fibers, polyaramid fibers, carbon fibers, or a combination thereof.

According to some embodiments, the inventive multilayer preform is placed on a mold platen and subjected to RTM, LCM, thermoplastic overmolding, or injection molding. In LCM, the liquid thermoset resin poured over the preform and the thermoset cured in the shape of the mold platen and at least one opposing mold platen, the platen collectively being complementary to the shape of the desired composite component. In RTM, catalyzed, thermoset resin is pumped into a closed mold under pressure, displacing the air at the edges of the mold, until the preform is enveloped and the mold is filled with curing resin. Thermoset resins operative herein illustratively include vinyl esters, polyurethanes, epoxies, polyureas, benzoxazines, maleimides, cyanate esters, phenolics and polyimides, each alone, a combination thereof, or in the presence of a foaming agent. It is appreciated that the thermoset resin can be used neat or loaded with chopped reinforcing fibers, particulate filler, or combinations thereof. Reinforcing fiber operative in the thermoset resin include those used in the continuous fiber bundles.

Composite components formed as vehicle component forms from an inventive thermoset resin overmolded preform illustratively include a vehicle bolster, vehicle post, a vehicle chassis, a pickup box, a cab load floor, a vehicle floor, a tailgate, a deck lid, a roof, a door panel, a fender, a wheel well, and body panels; heavy truck components that illustratively include the aforementioned and sleeping compartment sections, farm equipment components that illustratively include drive cab body components; motor home floors and wall panels; and marine products such as decking, sound damping panels, and cockpit sections; and train car components illustratively including seats, flooring, roof sections, and walls.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

SCFBP-technology offers several advantages including:
varying the angle of fiber placement during the lay-up process freely between 0 and 360°;
repeated fiber placement on the same area allows for local thickness variations in the fiber preform suited for a fiber composite component,
the conversion of the desired fiber orientation in a fiber placement pattern for an embroidery machine requires minor development times and costs,
the process allows a near-net-shape production, which results in low waste and optimal fiber exploitation,
the ability to process a variety of fibers such as natural, glass, aramid, carbon (high strength and high modulus) and ceramic fibers.

In order to efficiently change yarn compositions, multiple sewing heads may be used, each sewing head loaded with a specific yarn composition and adding those regions desired to have a given yarn composition. According to some embodiments, thermoplastic sewing thread is preferred to retain yarn in position as the shape of a component is developed, while in various embodiments a non-melt sewing thread is preferred. In a specific inventive embodiment, the SCFBP form may be skinned with a thermoplastic veil sheet prior to melting to yield the component.

Through the strategic placement of the fiber bundle, varying amounts of different reinforcing materials such as carbon fiber or matrix materials such as thermoplastic material are placed to yield a perform that efficiently utilizes the comparatively expensive carbon fiber, for example, content to toughen the resulting vehicle. According the present invention commingled fibers are retained in a series of two dimensional layers that are sequentially constructed by SCFBP.

The reinforcement fibers in a commingled fiber bundle being glass fibers, polyaramid fibers, carbon fibers, or a combination of any of the aforementioned. In embodiments in which matrix fibers are present in the fiber bundle, the matrix fibers in the comingled fiber bundle may be thermofusible nature and may be formed from a thermoplastic material such as, for example, polypropylenes, polyamides, polyesters, polyether ether ketones, polybenzobisoxazoles, polyphenylene sulfide; block copolymers containing at least of one of the aforementioned constituting at least 40 percent by weight of the copolymer; and blends thereof. The thermoplastic fibers are appreciated to be recycled, virgin, or a blend thereof. It is appreciated that the commingled fibers are either parallel to define a roving or include at some fibers that are helically twisted to define a yarn. It is appreciated that the physical properties of fibers retained in a helical configuration within a fixed matrix of a completed composite component are different than those of a linear configuration, especially along the fiber axis.

An inventive preform is created by laying out one or more commingled fiber bundles on a substrate as a two-dimensional base layer that defines a shape of the preform with stitching applied to retain the commingled fibers in a desired placement on the substrate. As is conventional to SCFBP, the substrate can be removed after production of the form, else it is retained and thereby incorporated into the resulting composite component. In various inventive embodiments, the stitching is a thermoplastic thread, non-melt material thread, or a metal wire. The thermoplastic thread in some inventive embodiments is formed of materials operative herein that illustratively include nylon, polypropylenes, polyamides, polyesters, polyether ether ketones, polybenzobisoxazoles, block copolymers. It is appreciated that the thread diameter and melting temperature of the thread used for stitching are variables that are readily selected relative to the properties of commingled fiber bundle. In some embodiments, the substrate is retained and adds the toughness of the resulting vehicle component. Exemplary substrates for SCFBP are disposable films, thermoplastic fabrics, fiberglass fabric, carbon fiber fabrics, polyaramid fabrics, and co-blends of any of the aforementioned, alone or in combination with thermoplastic or naturally occurring fibers. Thermoplastic fibers or fabrics include the aforementioned polymers recited above, while naturally occurring fibers illustratively include cotton, linen, jute, bamboo and silk.

As used herein, any reference to weight percent or by extension molecular weight of a polymer is based on weight average molecular weight.

Referring now to FIG. 1A, a fiber preform 10 according to one embodiment of the present invention is shown. The fiber preform 10 includes a substrate 12 which acts as a foundation or base upon which a fiber bundle 14 is applied. The fiber bundle 14 includes one or more reinforcing fibers of carbon fiber, glass fiber, and aramid. In a specific inventive embodiment, the fiber bundle 14 is made of comingled reinforcing fibers, illustratively including those made of carbon, glass, and aramid fibers. As noted each of the bundles 14 may be made exclusively of reinforcing material. According to embodiments, the fiber bundle 14 further includes a matrix material, such as a thermoplastic material such as, for example, polypropylenes, polyamides, polyesters, polyether ether ketones, polybenzobisoxazoles, polyphenylene sulfide; block copolymers containing at least of one of the aforementioned constituting at least 40 percent by weight of the copolymer; and blends thereof. The thermoplastic fibers are appreciated to be recycled, virgin, or a blend thereof. According to various embodiments, the fiber bundle 14 also includes electrical wiring. In such embodiments, the electrical wiring and wiring harness is internalized in within the fiber preform, thereby simplifying the resulting vehicle component and reducing vibrationally induced wear observed in traditional electrical harnesses. Electrically conductive insulated wire is also stitched by the SCFBP process into the form to create pre-selected electrical pathways. The final panel is them formed by melting any thermoplastic fibers within the SCFBP form in contact with at least one mold platen complementary to the finished vehicle component to form a vehicle panel such as a dashboard, body panel, door component, roof components, or decklids The substrate 12 may be a tear-off fabric or paper or other suitable material. The fiber bundle 14 is applied to the substrate 12 by a selective comingled fiber bundle positioning (SCFBP) method and attached to the substrate 12 by a plurality of stitches 18a-18d of a thread. The plurality of stitches 18a-18d are shown in various zig-zag stitch arrangements. For example, the stitches may be closely spaced stitches 18a and 18d or spaced apart by a greater linear distance such as stitches 18b and 18c. The stitches may be continuously connected along the fiber bundle 14 such as stitches 18a, or the stitches may be discrete and separate single stitches 18c or separate groups of stitches such as stitches 18b and 18d. In the case of thermofusible thread, the plurality of stitches 18 may also attach the fiber bundle to itself. The fiber bundle 14 may be applied in any arrangement on the substrate 12.

The arrangement of the fiber bundle 14 on the substrate 12 may generally resemble the shape of the designed final composite material component, for example a structural component of an automobile. Alternatively, the arrangement of the fiber bundle 14 on the substrate 12 may be designed to have a shape that corresponds to an edge or a portion of the final composite material that is to be reinforced with the preform. The fiber bundle 14 may be arranged in a principal direction, in other words in a principal direction of stress of the final composite material component. In FIG. 1A, the principal orientation of the fiber bundle 14 is along a longitudinal axis X of the fiber preform 10, however, other suitable orientations are also possible and may be used based on the design considerations and stresses for each composite material part. FIG. 1A illustrates only a first preform layer 11.

It is appreciated that the comingled fibers are either parallel to define a roving or include at some fibers that are helically twisted to define a yarn. It is appreciated that the physical properties of fibers retained in a helical configuration within a fixed matrix of a completed component are different than those of a linear configuration, especially along the reinforcing fiber axis. The relative number of reinforcing fibers is highly variable in the present invention in view of the disparate diameters of glass fibers, polyaramid fibers, and carbon fibers.

Figure 1B:
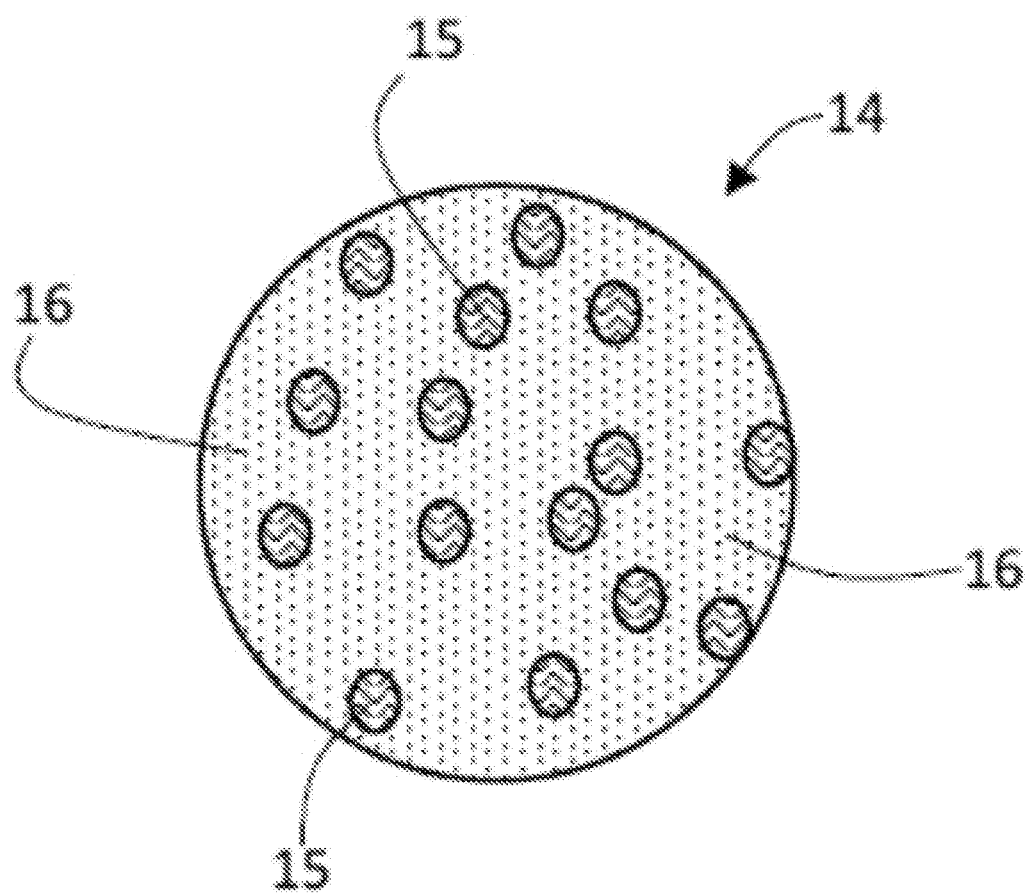
FIG. 1B is cross-sectional schematic view of the fiber bundle of FIG. 1.
Figure 2A:
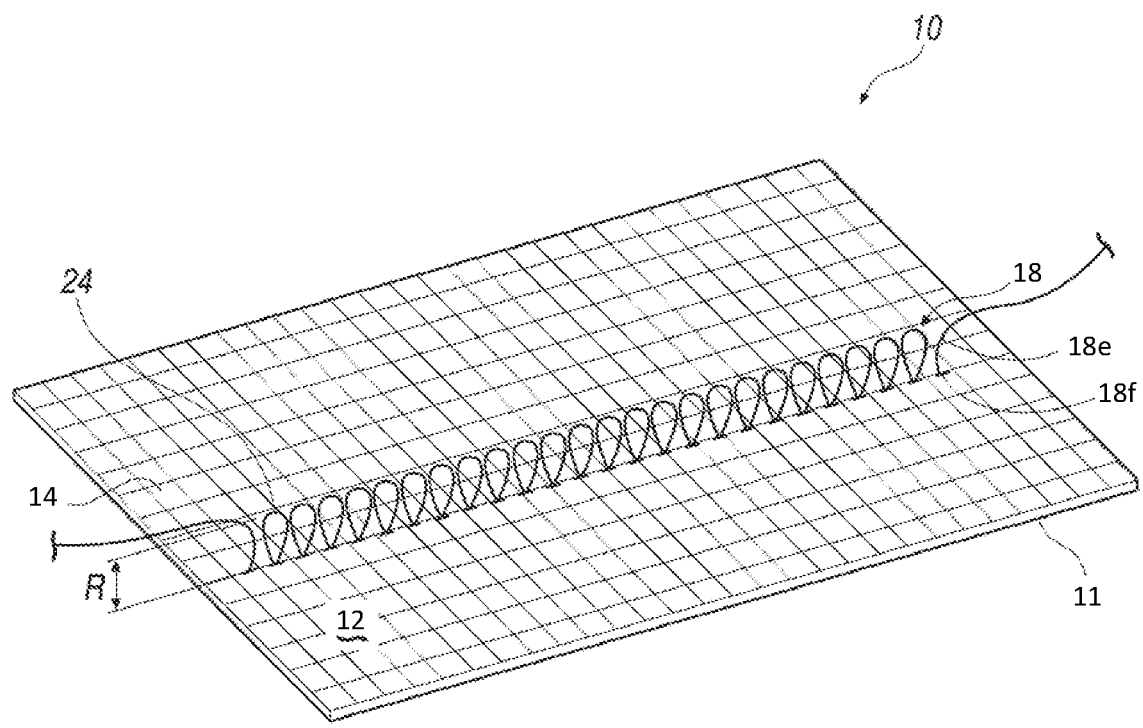
FIGS. 2A-2D is a schematic illustrating a portion of inventive fiber preform with a network of stitching material retained therein.
Figure 2B:
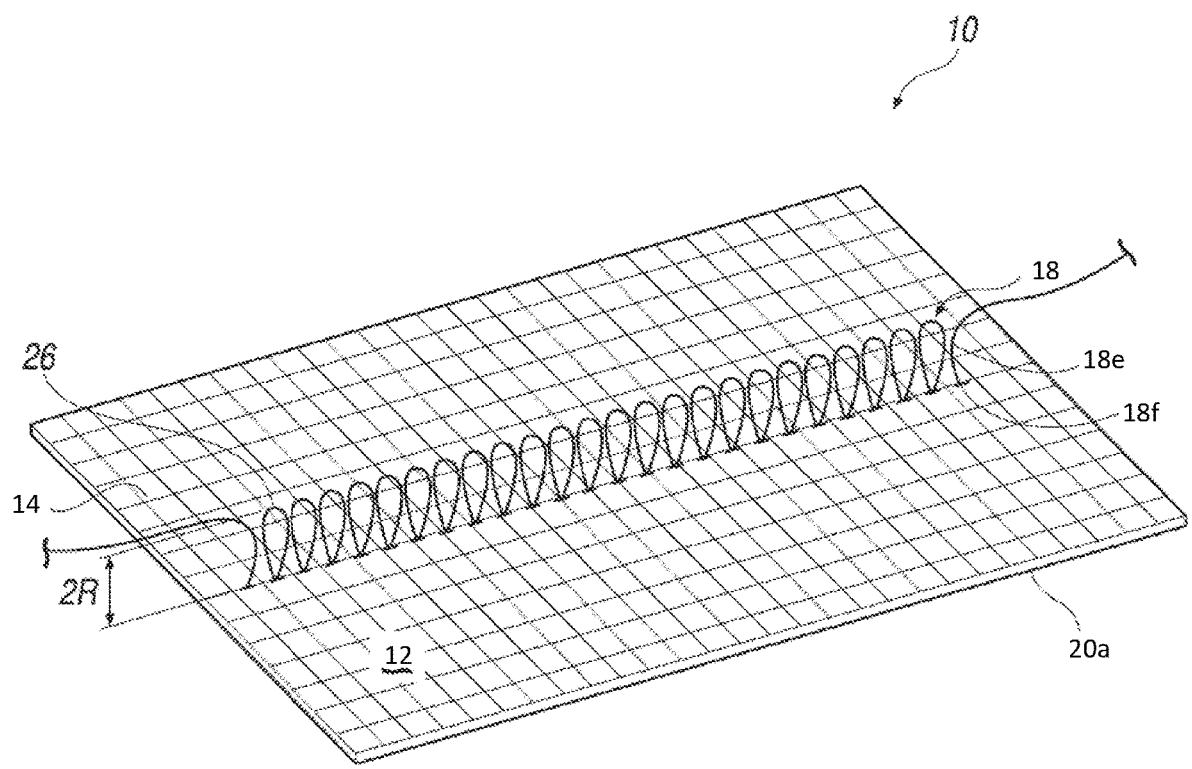
Figure 2C:
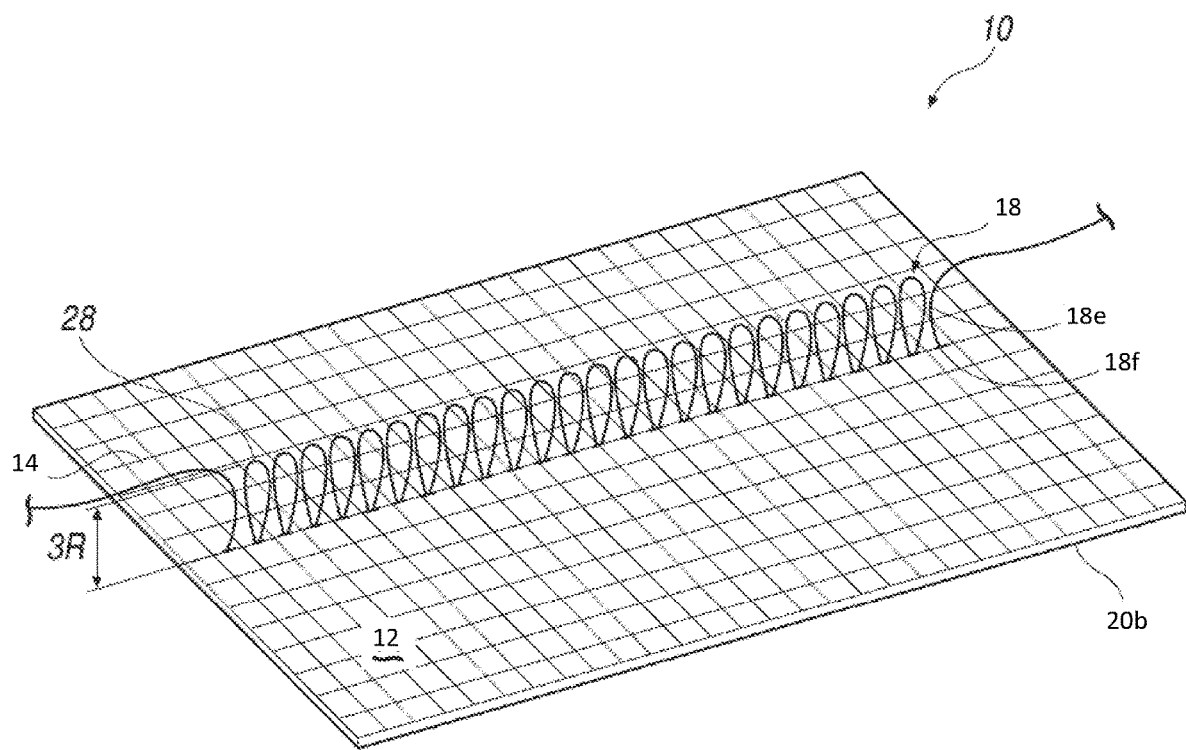
Figure 2D:
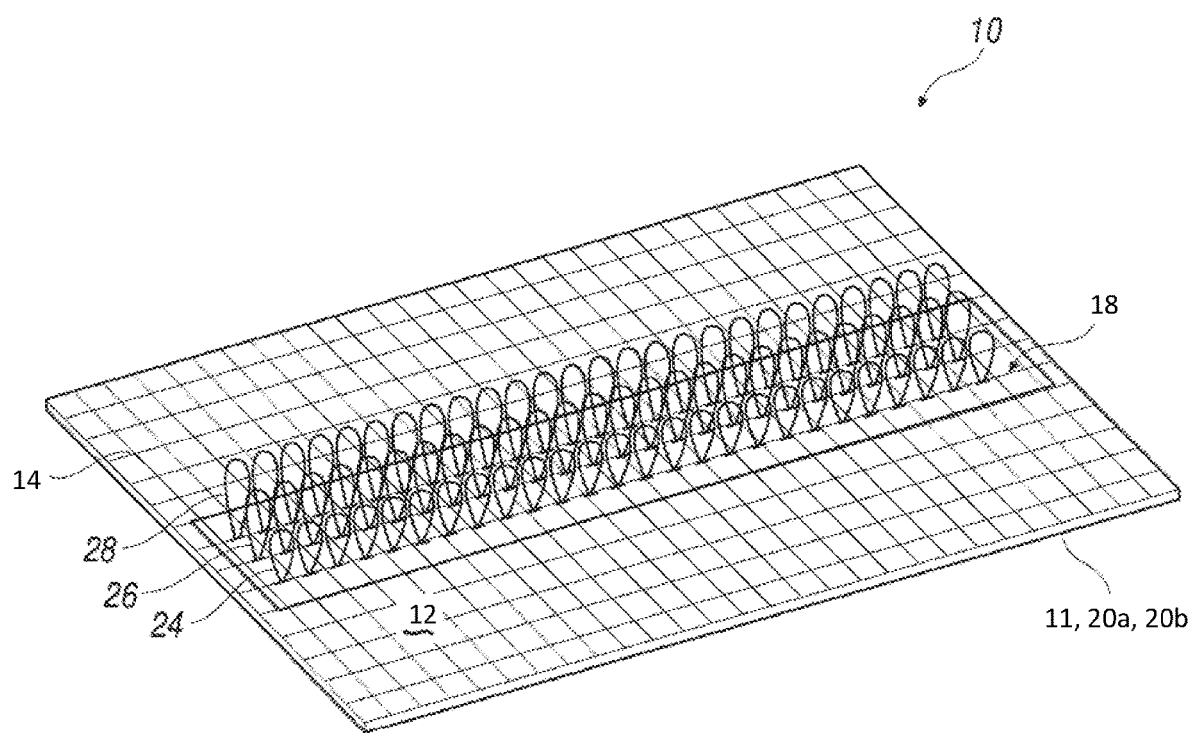
Figure 3:
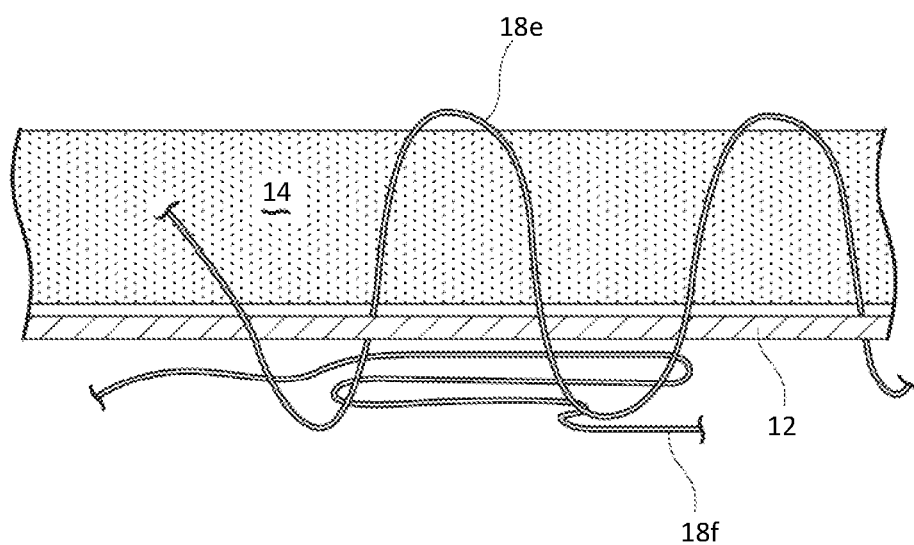
FIG. 3 is a magnified cross sectional view depicting the stitching material in a fiber preform.

As shown in FIG. 1B, the fiber bundle 14 may include a subset of comingled fiber bundle fibers 15, a subset of roving fibers 16, or a combination thereof. The comingled fiber bundle fibers 15 are helical or spun while the roving fibers are parallel to one another and not helical. The fiber bundle 14 may be a single continuous fiber bundle fed from a spool in the SCFBP process to form the fiber preform 10. Alternatively, the fiber preform 10 may be formed of multiple separate fiber bundles. Using multiple fiber bundles to form the fiber preform allows for fiber bundles having different reinforcing fibers, which enables tuning of the fiber preform insert. Additionally, increasing the number of fiber bundles used in the SCFBP process speeds the fiber preform manufacturing process, which increases throughput and efficiency. The multiple fiber bundles may be applied to the substrate together starting from the same end of the substrate or they may be applied spaced apart with each beginning at opposite ends of the substrate and converging at a middle region between the ends of the substrate. The thread that attaches the fiber bundle 14 to the substrate 12 may be a thermoplastic thread such as nylon or polyethylene material. Alternatively, the stitching thread may be a non-melt material such as or a glass fiber thread, a carbon fiber thread, an aramid fiber thread, or a metal wire.

The fiber preform 10 is tunable and easily changed and adapted for varying design requirements. The properties and characteristics of the fiber preform may be changed and modified based on controlling parameters of the various components of the fiber preform including parameters of the fiber bundle 14, the thread material, and the plurality of stitches 18a-18d. Parameters of the fiber bundle may include, but are not limited to, a diameter of the fiber bundle. Parameters of the thread may include, but are not limited to, a denier of the thread, a composition of the thread, and a melting temperature of a thermoplastic thread when used. The parameters of the plurality of stitches 18a-18d may include, but are not limited to, a linear distance between the stitches and a tension of the stitches. The details of forming such a preform are detailed in a co-pending provisional application entitled "VEHICLE COMPONENT BASED ON SELECTIVE COMINGLED FIBER BUNDLE POSITIONING FORM" Ser. No. 62/486,288 filed Apr. 17, 2017.

Thread and Stitches

Referring again to FIG. 1A, the plurality of stitches 18 are shown in various zig-zag stitch arrangements. For example, the stitches may be closely spaced stitches 18a and 18d or spaced apart by a greater linear distance such as stitches 18b and 18c. The stitches may be continuously connected along the fiber bundle 14 such as stitches 18a, or the stitches may be discrete and separate single stitches 18c or separate groups of stitches such as stitches 18b and 18d. The plurality of stitches of thread may also attach the fiber bundle to itself. Increasing the number of stitches used to attach the fiber bundle to the substrate increases the thread to fiber bundle ratio, which is yet another tunable parameter of the fiber preform. The tension of the plurality of stitches may also be controlled. For example, low tension stitches results in a lose attachment of the fiber bundle to the substrate. In embodiments in which the thread is a thermoplastic thread, low tension stitches result in more thermoplastic thread material in the fiber preform. Alternatively, high tension stitches result in a tight attachment between the fiber bundle and the substrate, an ability to put the fiber bundle in compression, and less thermoplastic thread material in the fiber preform when the thread is a thermoplastic thread material. The thread to fiber bundle ratio may be controlled according to design configurations by balancing the number, arrangement of, linear distance between, and tension of the plurality of stitches.

In embodiments in which the thread is a thermoplastic thread, the thermoplastic thread intersects itself at various points throughout the fiber preform 10. When the fiber preform 10 is heated to the melting temperature of the thermoplastic thread, the thermoplastic thread fuses to itself at those intersections to form tacking points. Increasing the number of stitches used to attach the fiber bundle to the substrate increases the number of tacking points.

According to some embodiments the thread for attaching the fiber bundle 14 to the substrate 12 is a thermoplastic thread. The thermoplastic thread may be a nylon or polyethylene material. The identity of the thermoplastic thread may be selected to have a melting temperature that is lower than the melting temperature of any optional thermoplastic fibers of the fiber bundle 14. At this lower second melting temperature, the solid thermoplastic thread melts to a liquid state. At this lower melting temperature, thermofusibility of only the thermoplastic thread occurs, while the state of any thermoplastic fibers of the fiber bundle is unaffected. According to various embodiments of the present invention, the melting temperature differential between the melting temperature of the thermoplastic fiber of the fiber bundle (first melting temperature) and the melting temperature of the thermoplastic thread (second melting temperature) may be at least 50° C., while in other embodiments the melting temperature differential may be more than 100° C.

As shown in FIGS. 2A-2D and 3, a partially transparent sectional view of a preform is shown generally at 10. The various layers sequential layers are shown is being laterally displaced, but it should be appreciated that these layers can be sewn overlaid. A commingled fiber bundle 14 (surrounded by the stitches and shown in ghost) is retained to a substrate 12 with stitching material generally at 18. The substrate 12 which acts as a foundation or base upon with the commingled fiber bundle 14 is applied. The substrate 12 may be a tear-off fabric or paper or other suitable material. It is appreciated that a conventional sewing machine head forms a chain stitch using a top stitching material thread 18e while a bobbin below the substrate 12 provides a lower stitching material thread 18f. In certain inventive embodiments, the commingled fiber bundle 14 is laid out in a base layer 11 in generally parallel lines with a given orientation on the substrate 12 as shown in FIGS. 2A-2D. The stitching material 18 extends along the length of the commingled fiber bundle 14 and generally orthogonal to the substrate 12 to form base layer stitches 24 having a vertical extent, R. In this context, "generally orthogonal" means angles in which the top thread 16a is 90±20 degrees relative to a substrate 14 at the point of the measured stitch.

The base layer 11 has a given orientation, while a second layer 20a, and a first successive layer 20b have like orientations of commingled fiber bundles 14 and the corresponding stitching 18, or in certain embodiments, the embodiments the layers 20a and 20b are applied with a commingled fiber bundle displayed at different orientations relative to the plane of the base layer 11. For example, layers 20a and 20b are deployed at angles of 90 degrees and 0 degrees, respectively. The second layer 20a is overlaid onto the base layer 11 and the stitching material 18 applied in the same way to tack the commingled fiber bundle 14 thereof to the substrate 12 with stitches 26 having a vertical extent of approximately 2R. Similarly, the first successive layer 20b applied on second layer 20a has stitches 28 having a vertical extent of approximately 3R.

The stitching material 18 is applied with a preselected tension, stitching diameter, stitch spacing. The stitching 18 is typically present in an amount of from 0.1 to 7 weight percent of the commingled fiber bundle 14.

It has been found that the stitching forming a network of loops extending through the thickness of a fiber preform are able to dissipate forces on the component and thereby make the preform have more attractive toughness relative to a component lacking unfused stitching and as a result, an inventive fiber preform is lighter and less expensive to produce.

By increasing the distance between stitches and using fewer stitches to attach the fiber bundle to itself and to the substrate, manufacturing throughput of fiber preform inserts for over molding is increased. Additionally, adding secondary tack points throughout the fiber preform allows for maintaining or increasing the shape-retaining rigidity of the fiber preform insert in addition to the enhanced throughput.

Figure 4:
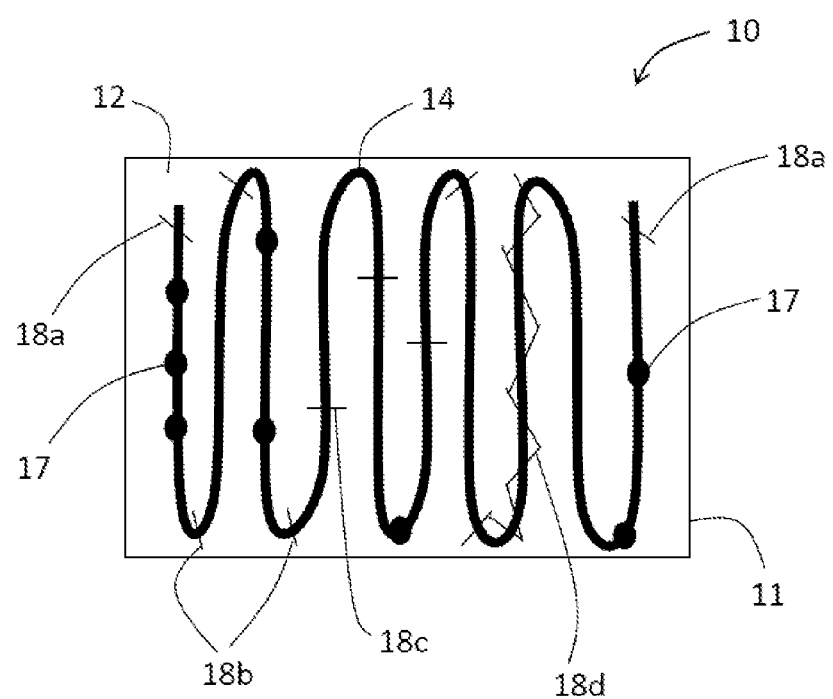
FIG. 4 is a schematic view of a fiber bundle stitched to a substrate forming a fiber preform according to an embodiment of the present invention.

According to various embodiments, the plurality of stitches 18 includes only as many stitches 10 as is necessary to secure the fiber bundle 14 to the substrate 12. For example, the number of stitches necessary to secure the fiber bundle 14 to the substrate 12 will depend in part on the arrangement of the fiber bundle 14 on the substrate 12 and the size of the fiber preform 10. Generally, the number of stitches 18 necessary to secure the fiber bundle 14 to the substrate means the stitches 18 are capable of holding the fiber bundle generally or approximately in its arranged position relative to the substrate 12. For example, the stitches may be discrete stitches 18a, 18b, 18c positioned long the length of the fiber bundle 14, or the stitches may be continuous stitches 18d. Generally, the goal of the stitches 18 is to secure the fiber bundle to the substrate with as few stitches as possible, thereby speeding the manufacturing time and increasing throughput of the fiber preform 10. As shown in FIG. 4, for example, the stitches 18a may be located at the ends of the fiber bundle 14. Alternatively, or in combination, the stitches 18b may be located at positioned where the fiber bundle 14 changes direction in its arrangement on the substrate 12; for example, at the curves or bends in the fiber bundle. Alternatively, or in combination, the stitches 18c may be located in linear portions of the fiber bundle. The plurality of stitches of thread may also attach the fiber bundle to itself. The tension of the plurality of stitches may also be controlled. For example, low tension stitches result in a lose attachment of the fiber bundle to the substrate and more thread material in the fiber preform. Alternatively, high tension stitches result in a tight attachment between the fiber bundle and the substrate, an ability to put the fiber bundle in compression, and less thread material in the fiber preform.

As shown in FIG. 4, the plurality of secondary tack points 17 throughout the fiber bundle 14 further attach the fiber bundle 14 to the substrate 12, attach the fiber bundle 14 to itself, or a combination thereof. According to various embodiments, the plurality of secondary tack points 17 are configurations of hot glue, sprayed on adhesive, fused points formed by ultrasonic welding, fused points formed by melting of the thermoplastic thread in embodiments that utilize a thermoplastic stitching thread. In embodiments in which the secondary tack points 17 are formed by melting the thermoplastic thread, the thermoplastic thread is melted by heating the fiber preform 10 to the melting temperature of the thermoplastic thread to fuse stitches of the thermoplastic thread to other stitches of the thermoplastic thread. Alternatively, the thermoplastic thread may be melted and fused by spot ironing or flat ironing the fiber preform 10. According to yet another form of the present disclosure, a thermoplastic powder is applied to the fiber bundle before or after the fiber bundle 14 is arranged on the substrate 12. The thermoplastic powder melts when heated and cures to form the plurality of secondary tack points. The plurality of secondary tack points 17 assist with speeding up the manufacturing process for such a fiber preform 10 by providing strength and stability to the preform 10 while allowing the number of stitches 18 to be reduced.

Figure 5:
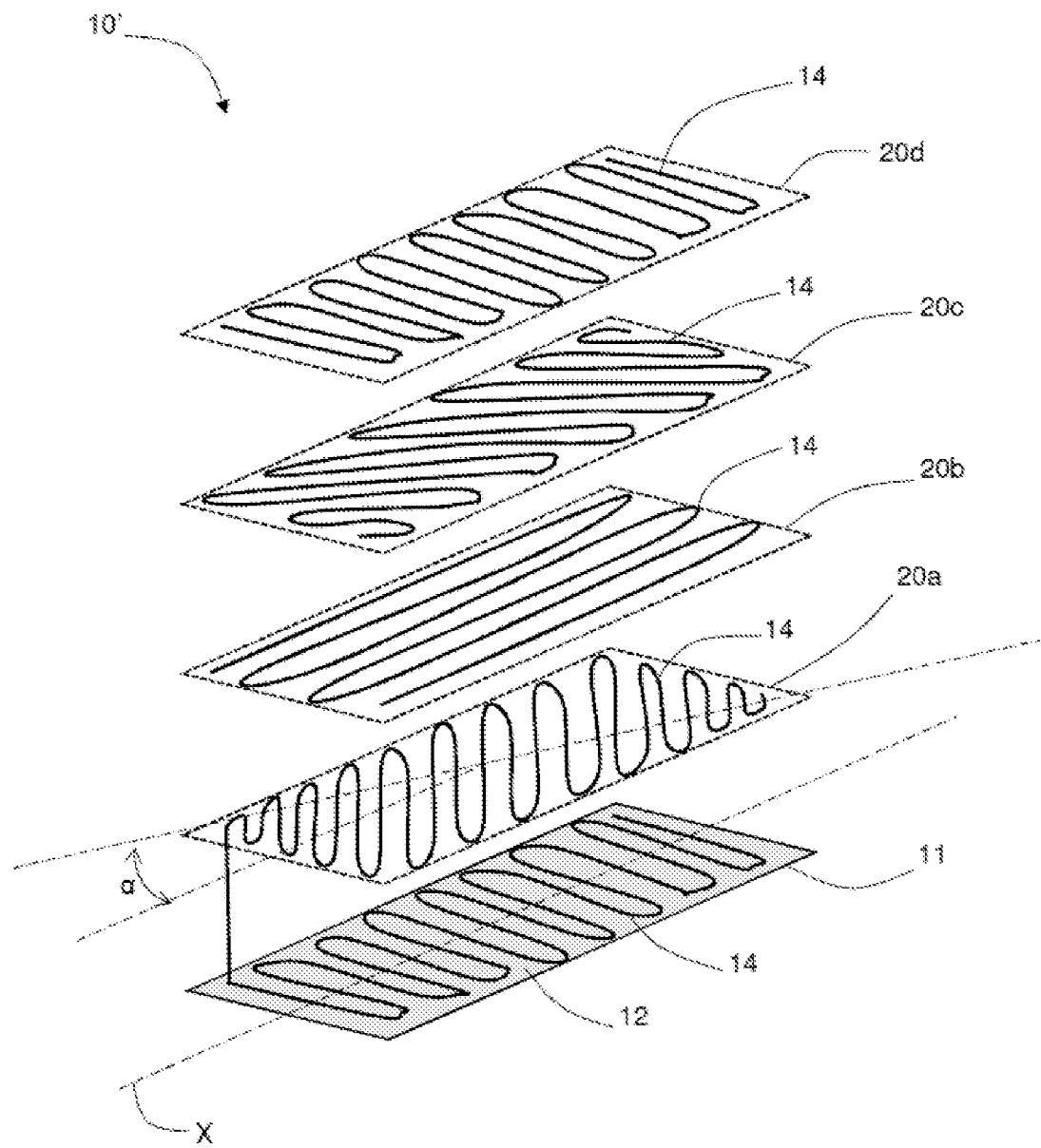
FIG. 5 is an exploded perspective view a multi-layered fiber preform according to an embodiment of the present invention.

As shown in FIG. 5, the fiber preform 10 according to one embodiment of the present invention includes the first preform layer 11 and at least one subsequent preform layer 20 formed of the fiber bundle 14 arranged upon the first preform layer 11. The plurality of secondary tack points 17 are in part positioned between the first preform layer 11 and the at least one subsequent preform layer 20. According to further embodiments, each subsequent preform layer 20 is arranged on a preceding preform layer and attached to the preceding preform layer by additional stitches of the thread, by additional secondary tack points, or a combination thereof. While the example fiber preform 10 shown in FIG. 5 includes four subsequent preform layers for a total of five preform layers including the first preform layer, it is appreciated that the at least one subsequent preform layers may include two to twenty layers. The fiber bundle 14 that forms each of the subsequent preform layers may be a continuation of the fiber bundle of the preceding preform layer or it could be a separate piece of fiber bundle.

In FIG. 5, the plurality of stitches of thread are not shown for the sake of clarity, but it will be readily understood that each layer of fiber bundle 14 is attached to the preceding layer and/or to itself by a plurality of stitches identical to those explained throughout the present disclosure. Additionally, each layer of fiber bundle 14 may also be attached to the preceding layer and/or itself by secondary tack points.

To achieve a quickened manufacturing process, according to various embodiments, stitching the first layer 11 of the fiber bundle 14 to the substrate 12 includes stitching using a plurality of stitching heads. Similarly, in certain embodiments, the stitching includes stitching only as many stitches as is necessary to secure the fiber bundle 14 to the substrate 12. As discussed above, the number of stitches necessary to secure the fiber bundle to the substrate may vary based on the predetermined pattern and generally means the fewest number of stitches such that the fiber bundle remains in the predetermined pattern relative to the substrate. In some embodiments, this includes stitching the first layer 11 of the fiber bundle 14 to the substrate 12 at a first end and a second end using stitches 18a. Alternatively or additionally, the stitching includes stitching the fiber bundle to the substrate at a plurality of curves in the predetermined pattern using stitches 18b.

According to various embodiments, creating secondary tack points 17 throughout the first layer 11 of the fiber bundle 14 to attach the fiber bundle 14 to itself, to the substrate 12, or a combination thereof includes applying hot glue to the fiber bundle as it is arranged on the substrate. The hot glue may be applied in dots, lines, or other suitable configurations. The secondary tack points 17 may be applied between the substrate and the fiber bundle, between portions of the fiber bundle, or a combination thereof. Some embodiments provide creating the secondary tack points 17 by applying a spray on adhesive to the first preform layer 11. Such an adhesive could be applied to the substrate 12 before the fiber bundle 14 is arranged upon it. Alternatively, or additionally, the adhesive spray may be applied to the fiber bundle 14 as the fiber bundle 14 is arranged on the substrate or after the fiber bundle is arranged on the substrate.

In some embodiments, creating the secondary tack points 17 includes ultrasonically welding points throughout the fiber bundle to fuse the fiber bundle to itself. The fiber bundle may fuse to itself when thermoplastic fibers in the fiber bundle or thermoplastic thread from the plurality of stitches melts upon being heated and fuses together upon cooling. In other embodiments, heating of the fiber preform 10 is used to create the secondary tack points 17. Heating the fiber preform to a temperature to melt the thermoplastic thread used for stitching the fiber bundle to the substrate melts the thread of those stitches to create the tack points while leaving the rest of the fiber preform unchanged. Alternatively, or additionally, heating the fiber preform to the temperature that melts any thermoplastic fibers in the fiber bundle also creates tack points while leaving the rest of the fiber preform, with a higher melting temperature, unchanged. In some embodiments, the secondary tack points 17 are created by applying a thermoplastic powder to the fiber bundle 14. The powder may be applied to the fiber bundle before or after the fiber bundle is arranged on the substrate. Once the powder is applied to the fiber bundle, the fiber preform 10 is heated to melts the thermoplastic powder. The secondary tack points 17 are formed when the melted thermoplastic powder cures or hardens when cooled.

According to various embodiments of the present disclosure, the method further comprises applying a second layer 20 of the fiber bundle 14 on to the first layer 11 of the fiber bundle in a second predetermined pattern and applying secondary tack points 7 between the first fiber bundle layer 11 and the second fiber bundle layer 20. Such secondary tack points 17 are created by any of the methods described above for creating secondary tack points. These secondary tack points 17, therefore, assist with holding the layers of the fiber bundle together. The second fiber bundle layer and any additional subsequent layers are built-up from the first layer and similarly stitched to a preceding layer using thread or thermoplastic thread. The second predetermined pattern may be the same as the first predetermined pattern. The second predetermined pattern may be angularly offset from the orientation of the first preform layer.

Arrangement of Fiber Bundle on Substrate

As further shown in FIG. 5, the fiber preform 10 according to one embodiment of the present invention includes the first preform layer 11 with its principal orientation along the X axis and a plurality of subsequent preform layers 20a, 20b, 20c, 20d formed of the fiber bundle 14 successively stacked from the first preform layer 11. Each subsequent preform layer 20a, 20b, 20c, 20d is arranged on a preceding preform layer and attached to the preceding preform layer by additional stitches of the thread. For example, the first subsequent preform layer 20a is arranged on and attached to the preceding first preform layer 11, the second subsequent preform layer 20b is arranged on and attached to the preceding first subsequent preform layer 20a, the third subsequent preform layer 20c is arranged on and attached to the preceding second subsequent preform layer 20b, and the fourth subsequent preform layer 20d is arranged on and attached to the third subsequent preform layer 20c. While the example fiber preform 10 shown in FIG. 5 includes four subsequent preform layers for a total of five preform layers including the first preform layer, it is appreciated that the plurality of subsequent preform layers may include two to twenty layers. The fiber bundle 14 that forms each of the subsequent preform layers may be a continuation of the fiber bundle of the preceding preform layer or it could be a separate piece of fiber bundle.

In FIG. 5, the plurality of stitches of thread are not shown for the sake of clarity, but it will be readily understood that each layer of fiber bundle 14 is attached to the preceding layer and/or to itself by a plurality of stitches identical to those explained throughout the present disclosure. It is appreciated that the stitches used to secure each subsequent preform layer could extend to the substrate, for example if it is desired to have a higher concentration of thread present in the fiber preform. Alternatively, the stitches used to attach each subsequent preform layer can extend to the preceding preform layer, which allows for a more efficient preform manufacturing process in that the penetration depth of the stitching needle need not be altered between the various layers of fiber bundle. After at least one of the subsequent preform layers has been stacked and attached to the first preform layer, the substrate may be removed from the fiber preform. Alternatively, the substrate may remain attached to the first preform layer until all of the subsequent preform layers have been stacked on and attached to the preceding preform layer, or the substrate can remain attached to the fiber preform throughout the composite material manufacturing process.

As shown in FIG. 5, the orientation of each subsequent preform layer may be offset from the orientation of the preceding preform layer. Offsetting the orientation of the various layers enables strength in multiple directions. The orientation of each subsequent preform layer may be offset from that of the preceding preform layer by an angular displacement a relative to the principal orientation of the first layer, for example the X axis. The layers can be overlaid with a variety of angular displacements relative to a first layer. If zero degrees is defined as the long axis X of the first preform layer 11, the subsequent preform layers are overlaid at angles of 0-90°. For example, in the fiber preform 10 shown in FIG. 5, the angular displacement a is 45° resulting in a 0-45-90-45-0 pattern of preform layers. Further specific patterns illustratively include 0-45-90-45-0, 0-45-60-60-45-0, 0-0-45-60-45-0-0, 0-15-30-45-60-45-30-15-0, and 0-90-45-45-60-60-45-45-90-0. While these exemplary patterns are for from 5 to 10 layers of uni-directional fibers, it is appreciated that the fiber preform may include from 3 to 20 layers. It is appreciated that the preform layers may be symmetrical about a central layer, in the case of an odd number of layers, or about a central latitudinal plane parallel to the layers. That is, as shown in FIG. 5, the orientation of the first layer 11 and the last of the subsequent preform layers 20d are generally the same while the first subsequent layer 20a and third subsequent preform layer 20c are symmetrical with one another, such that the layers 11, 20a, 20c, and 20d are symmetrical about the center layer 20b. Providing the various preform layers with symmetrical orientations enables the fiber preform 10 to resist warping. In addition to the substantially linear pattern of comingled fiber bundle positioning depicted in drawings with interspersed swithchbacks, it is appreciated that other patterns operative herein illustratively include spirals, and any space filling curve such as a Peano curve, dragon curve, or Sierpinksi curve.

Figure 6:
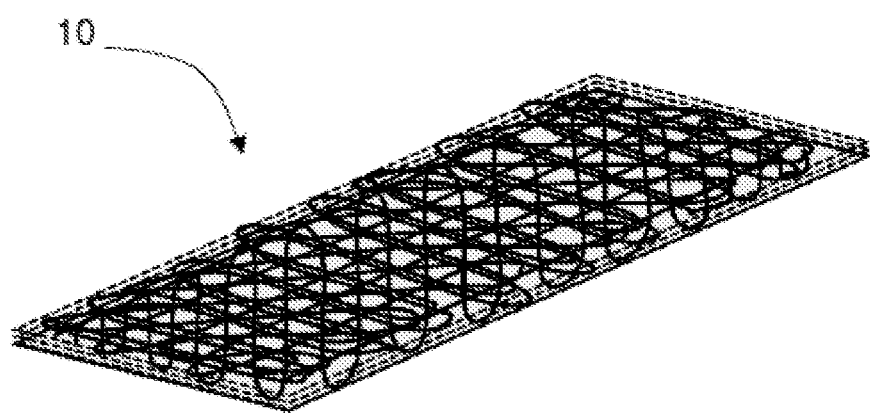
FIG. 6 is a perspective view of the multi-layered fiber preform of FIG. 5.

As shown in FIG. 6, the fiber preform 10 having of a plurality of preform layers has a generally two-dimensional shape, that is, while the various layers give the fiber preform 10 a thickness, the fiber preform is substantially flat or planar.

Figure 7:
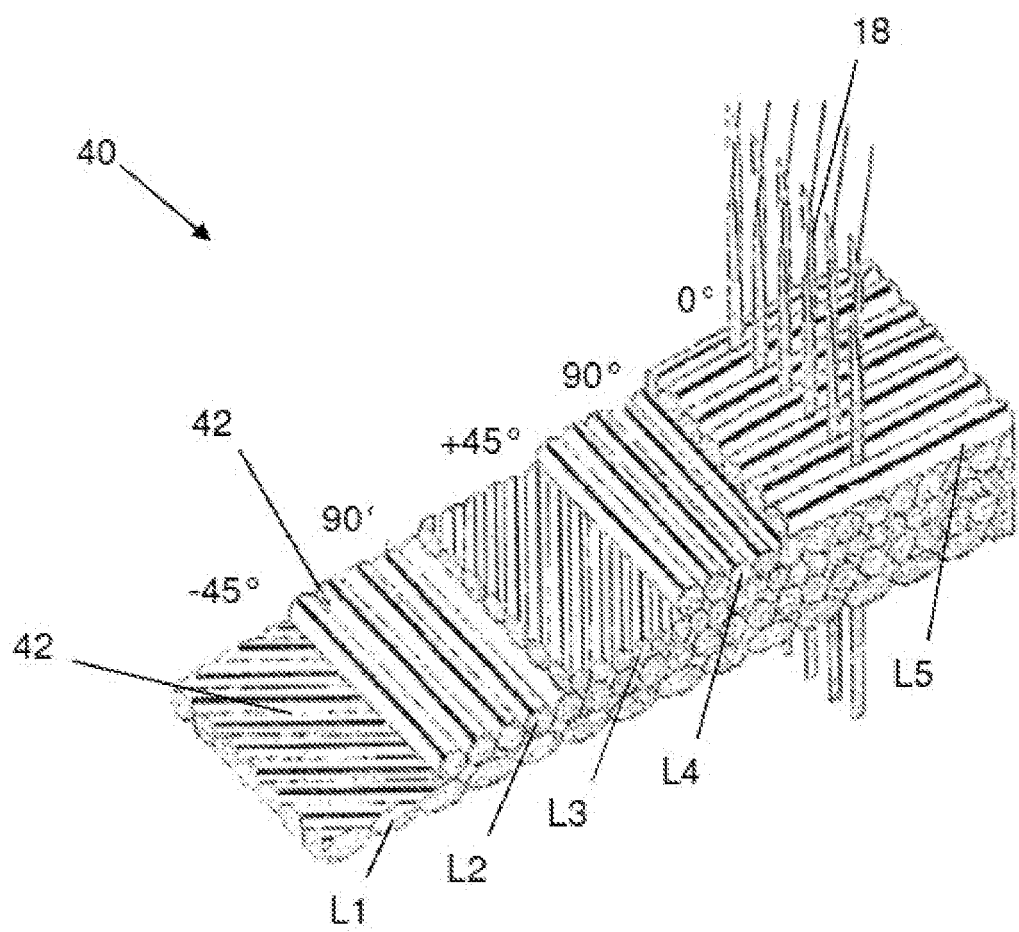
FIG. 7 is a perspective view of a selective commingled fiber bundle positioning (SCFBP) assembly formed of layers of reinforcement fibers illustratively including glass fiber, carbon fiber, and polyaramid fibers that are retained with stitching in accordance with embodiments of the invention using conventional interlayer orientation differences.

FIG. 7 is a perspective view of a selective commingled fiber bundle positioning (SCFBP) assembly 40 formed of layers of reinforcement fibers 42 illustratively including glass fiber, carbon fiber, and polyaramid fibers that are retained with stitching 18. The angles of the individual layers (L1, L2, L3, L4, L5) of reinforcement fibers 42 are varied during the lay-up process. Each of the individual layers (L1, L2, L3, L4, L5) may be composed of a single type of reinforcement fiber where the fibers are arranged parallel to each other in an individual layer.

Process

According to embodiments, an inventive fiber preform 10 is formed by providing a substrate 12, applying a first layer 11 of fiber bundle 14 of one or more of glass, carbon, and polyaramid fibers and securing the fibers to the substrate 12 in a predetermined pattern having a principal orientation, for example along the X axis. The process continues by stitching the first layer 11 of the fiber bundle 14 to the substrate 12 using a thread. In some embodiments the thread is a thermoplastic thread having a melting temperature that is lower than the first melting temperature. Subsequent layers 20a, 20b, 20c, 20d of the fiber bundle 14 are then built-up from the first layer 11 and similarly stitched to a preceding layer using the thread. As described above, the fiber preform 10 produced according to the process of the present disclosure may have subsequent preform layers that are offset from the preceding layer by an angular displacement relative to the principal orientation of the first layer 11. The angular displacement may be anywhere from 0-90 degrees or, for example, may be any one of 15 degrees, 30 degrees, 45 degrees, 60 degrees, 75 degrees, and 90 degrees, or a combination of various angles. The process may also include removing the substrate 12 once the preform layers have been built-up form the first layer 11.

Figure 8:
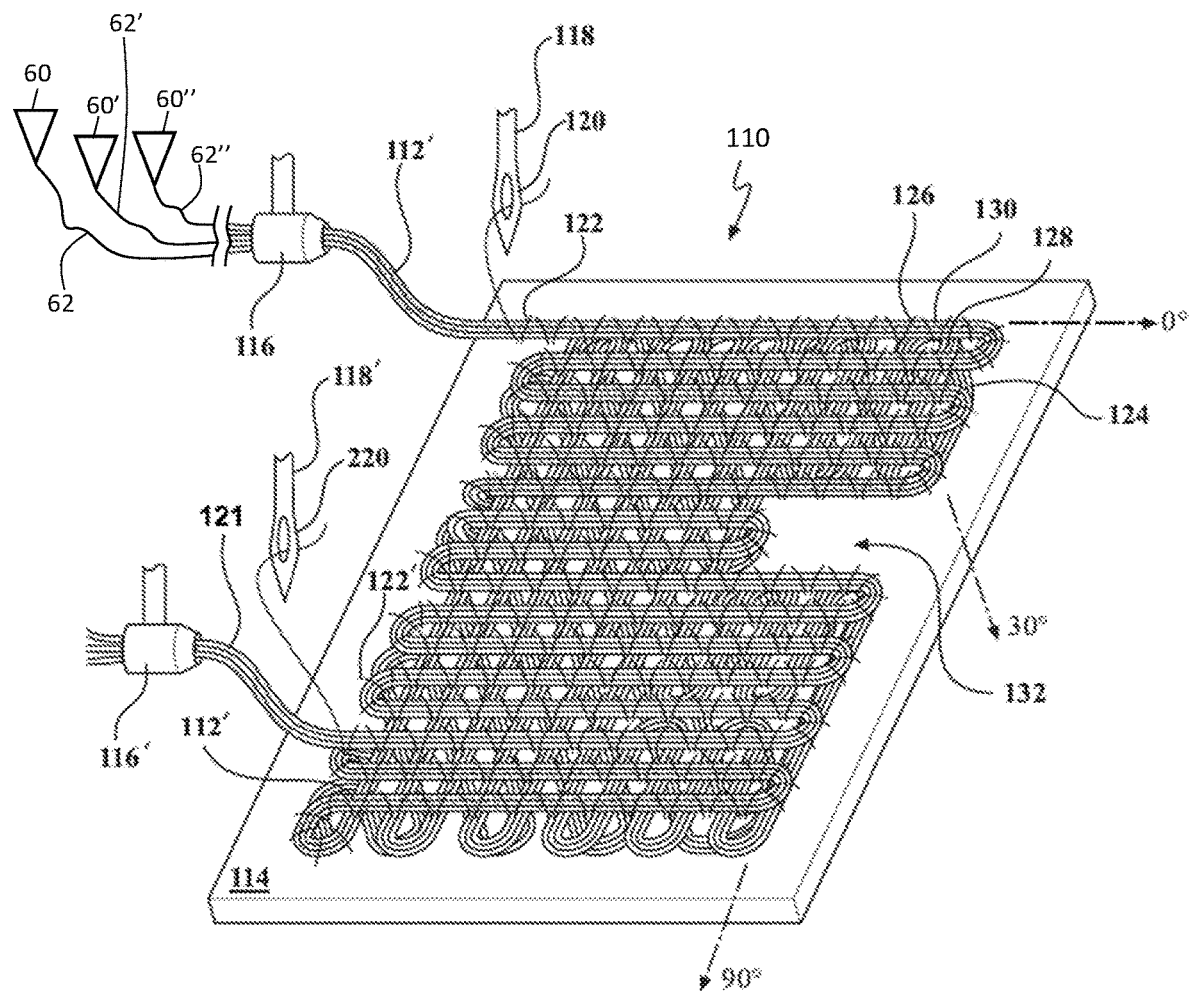
FIG. 8 is a schematic illustrating a SCFBP preform created from multiple continuous fiber bundles according to the present invention.

FIG. 8 shows an inventive preform 110 is in the process of being created. A spool 60 contributes a reinforcing fiber 62, while at least one additional spool 60' and 60" of reinforcing fiber or matrix fiber is combined with the reinforcing fiber 60 to yield a commingled fiber bundle 112. According to embodiments, the modification of the percentage of carbon fiber reinforcing fiber relative to other types of reinforcing fiber used in preform 110, the total percentage of reinforcing fiber, or a combination thereof are readily controlled. While spool 60 contributes carbon fiber 62 to the commingled fiber bundle 112, spool 60' is provides glass fiber 62' or polyaramid, shown generically at 62". It is appreciated that multiple additional spools of various types of reinforcement fibers or matrix fibers beyond the three depicted in FIG. 8 are readily used to form a commingled fiber bundle 112, yet these additional spools are not depicted for visual clarity. The process of creating a commingled fiber bundle 112 is routinely performed commercially. It is appreciated that any given reinforcing fiber or matrix fiber 62, 62', or 62" is readily cut, creating a length of commingled fiber bundle 112. Upon feeding the cut end of the depleted fiber back into the cording or other conventional equipment that affords the commingled fiber bundle 112 as an output, and is inserted in a portion of the preform 110.

The commingled fiber bundle 112 is conveyed to a substrate 114 by a guide pipe 116 to lay out the commingled fiber bundle 112 in predetermined pattern on the substrate 114. A conventional sewing machine head operating a needle 118 with a top thread 120 tacks the commingled fiber bundle 112 with stitches 122, for example of thermoplastic thread. A bobbin below the substrate 114, includes a bobbin with a lower thread are not shown, and are conventional to sewing machines. The top thread 120 and the bottom thread are thermoplastic threads, glass fiber threads, carbon fiber threads, aramid fiber threads, or metal wires, according to embodiments. In certain inventive embodiments, the commingled fiber bundle 112 is laid out in a base layer 124 in generally parallels lines with a given orientation. Switchback turn regions 126 are commonly used to lay out parallel lines of commingled fiber bundle 112. As shown in FIG. 8, base layer 124 has an orientation of 30 degrees, while a first successive layer 128, and a second successive layer 130 have orientations of 90 degrees and 0 degrees, respectively. This is best seen in the notch region 132 in the preform 110. The commingled fiber bundle 112 that is enriched in carbon fiber is depicted as shaded and designated at 112' relative to comparatively carbon fiber depleted commingled fiber bundle 112". As a result of the present invention, the preform 110 includes specific features such as the notch region 132 that conventionally would be cut from a base piece. In this way, the present invention eliminates the cutting step, as well as the associated waste generation. In addition to the substantially linear pattern of commingled fiber bundle positioning depicted in FIG. 8 with interspersed switchbacks, it is appreciated that other patterns operative herein illustratively include spirals, and any space filling curve such as a Peano curve, dragon curve, or Sierpinksi curve.

If zero degrees is defined as the long axis of the base layer 124, the subsequent layers are overlaid at angles of 0-90°. For example, an angular displacement between adjacent layers is 45° resulting in a 0-45-90-45-0 pattern of layers. Further specific patterns illustratively include 0-45-90-45-0, 0-45-60-60-45-0, 0-0-45-60-45-0-0, 0-15-30-45-60-45-30-15-0, and 0-90- 45-45-60-60-45-45-90-0. While these exemplary patterns are for from 5 to 10 layers of directional SCFBP, it is appreciated that the preform 110 may include from 3 to 20 layers. It is appreciated that the form layers may be symmetrical about a central layer, in the case of an odd number of layers, or about a central latitudinal plane parallel to the players.

The stitching 122 is applied with a preselected tension, stitching diameter, stitch spacing. The stitching 122 is typically present in an amount of from 0.1 to 7 weight percent of the commingled fiber bundle 112' or 112".

While FIG. 8 only shows three layers, it is appreciated that a preform 110 is readily formed with up to 20 layers with the only technical limit being the length of the travel of the needle 118. While commingled fiber bundle 112" has a first ratio of reinforcement fibers to the other reinforcement fibers, commingled fiber bundle 112' have a different ratio therebetween. These ratios in a prototypical embodiment of the present invention varying between layers 124 and 128 of the preform 110.

Figure 9:
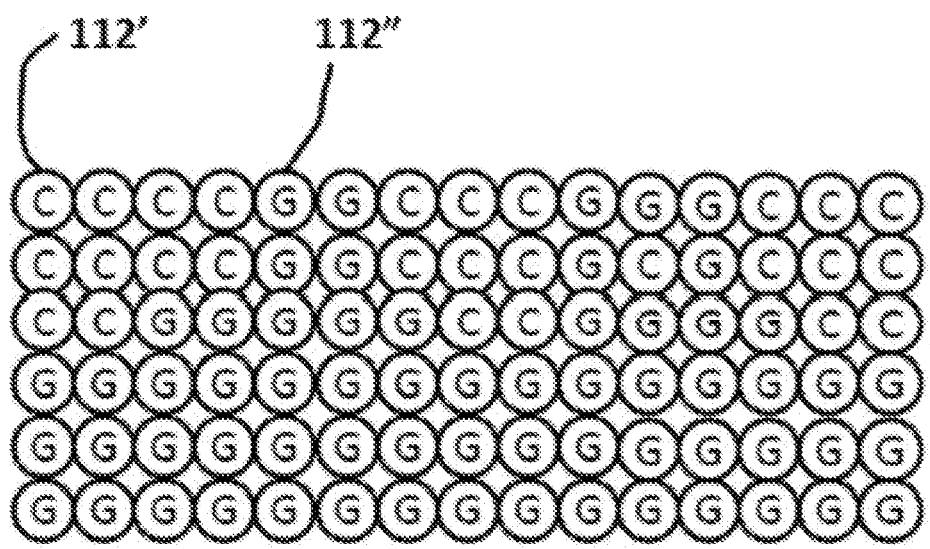
FIG. 9 is a cross section representation of a SCFBP preform, where C stands for a carbon fiber rich commingled fiber bundle and G stands for glass fiber rich commingled fiber bundle, in accordance with embodiments of the invention.

A cross-sectional view of an exemplary form similar to form 110 is shown in FIG. 9 with seven layers, where C denotes a carbon fiber enriched commingled fiber bundle 112' and G denotes a carbon fiber depleted commingled fiber bundle 112" to illustrate regions of selective toughening to enforce the edges and center of the form. In this way carbon fiber is used efficiently. In contrast to the form 110, with adjacent layers varying in angle, FIG. 9 shows the adjacent layers parallel for visual clarity. No stitches are shown for visual clarity.

Referring again to FIG. 8, embodiments may include a second conventional sewing machine head' operating a needle 118' with a top thread 220 tacks a devoted carbon depleted commingled fiber bundle 112" with stitches 122'. Duplicate spools 60, 60', and 60" feed reinforcement fibers 62, 62', and 62" respectively to a duplicate guide pipe 116' to form commingled fiber bundle 112". A second bobbin below the substrate 114, includes a bobbin with a lower thread are not shown, and are conventional to sewing machines. The top threads 120 and 220, can be the same or different and likewise the bottom threads. The needle 118 in FIG. 8 now is devoted to only applying a uniform commingled fiber bundle 112' that is enriched in carbon fiber relative to 112". While only two separate sewing heads are shown in FIG. 8, it should be appreciated that additional sewing heads are readily used to simultaneous stitch commingled fiber bundles to create a form. This being especially the case when the form is for a large area form as might be employed in a vehicle component such as a floor. Patterns as detailed with respect to FIG. 8 are readily formed in this embodiment.

Figure 10:
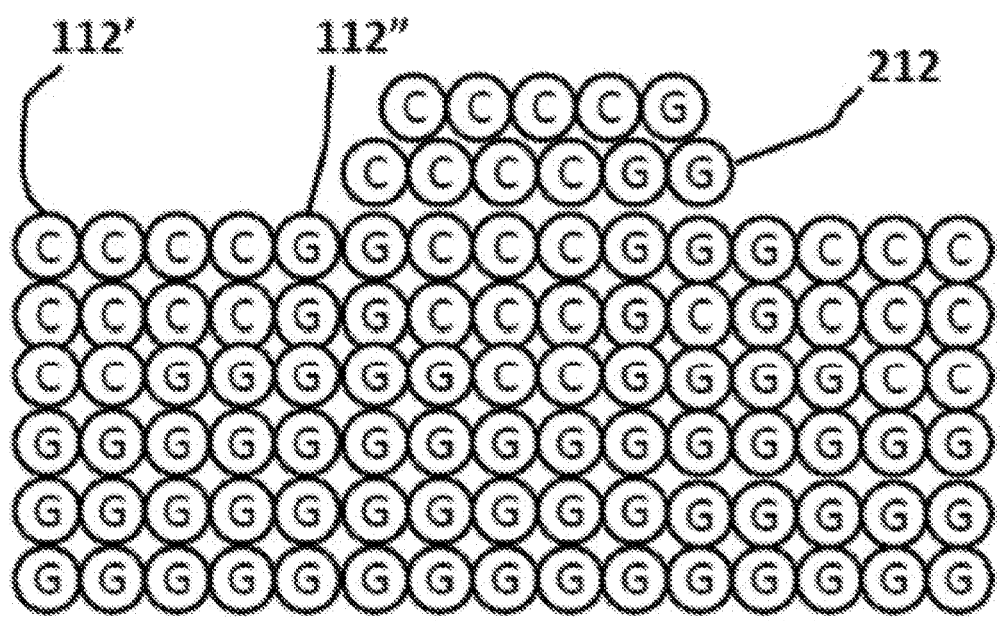
FIG. 10 is a schematic illustrating a SCFBP preform created according to the present invention with a void underlying a top surface, with the naming convention used in FIG. 9.

FIG. 10 is a cross-sectional view of a SCFBP preform created according to the present invention per FIG. 8 with two partial layers 212 extending from a top surface of a seven-layer inventive preform, with the common naming convention used with respect to FIG. 9. A partial layer 212 is formed simply by applying a commingled fiber bundle as an incomplete top layer during the SCFBP process. In certain inventive embodiments, the partial layer 212 is a majority by weight in partial layer 212 is the carbon enriched commingled fiber bundle 112', in which like reference numerals have the meaning previously ascribed thereto. In still other inventive embodiments, the partial layer 212 is solely the carbon enriched commingled fiber bundle 112'. In contrast to the preform 110 or 210, with adjacent layers varying in angle, FIG. 10 shows the adjacent layers parallel for visual clarity. No stitches are shown for visual clarity.

Figure 11:
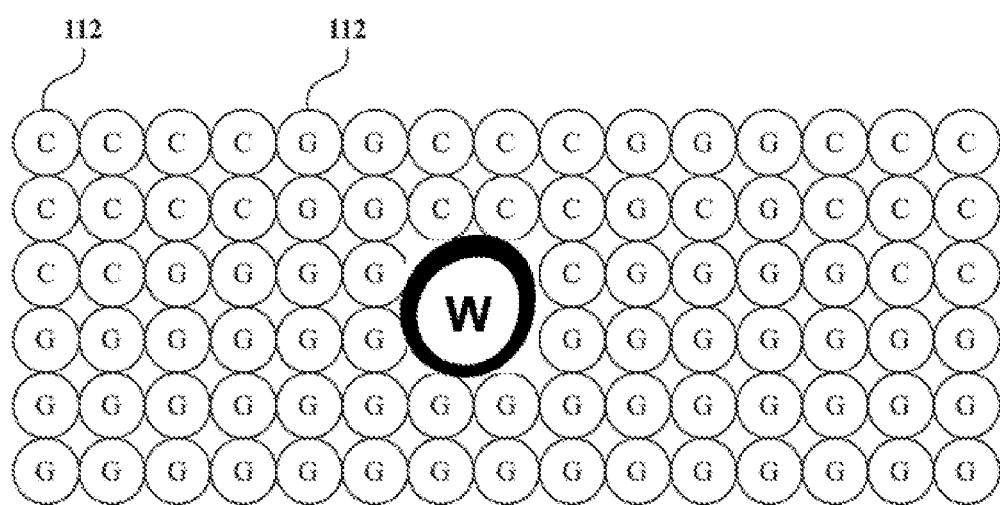
FIG. 11 is a cross section representation of a SCFBP form, where C stands for a carbon fiber rich commingled fiber bundle and G stands for glass fiber rich commingled fiber bundle, in accordance with embodiments of the invention.

A cross-sectional view of an exemplary form similar to form 210 is shown in FIG. 11 with seven layers, where C denotes a carbon fiber enriched commingled fiber bundle 112, G denotes a carbon fiber depleted commingled fiber bundle 112 to illustrate regions of selective toughening to enforce the edges and center of the form, and W denotes wiring 121. In this way carbon fiber is used efficiently to toughen while the part includes electrical wiring. FIG. 11 shows the adjacent layers parallel for visual clarity. No stitches are shown for visual clarity.

Figure 12:
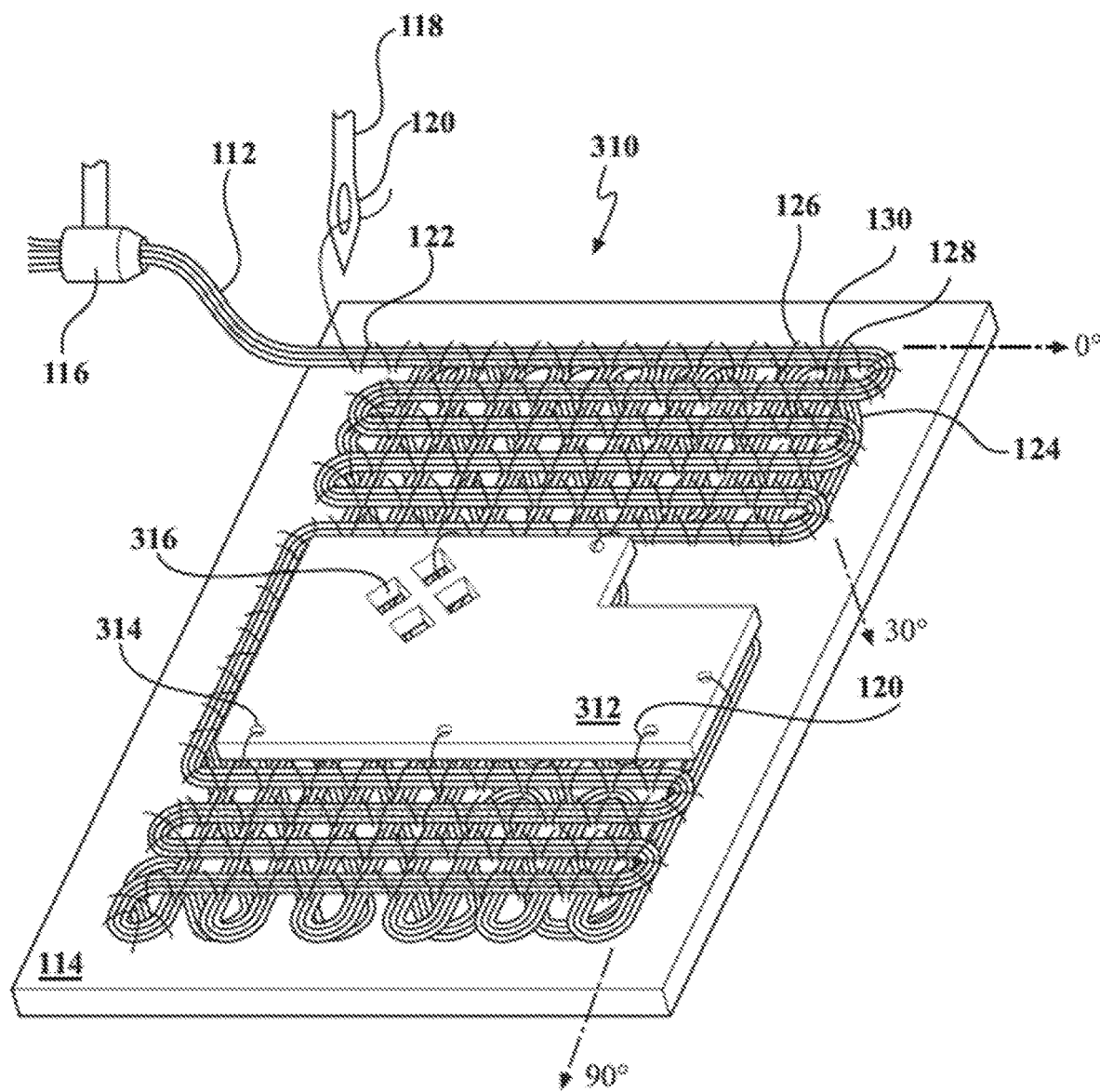
FIG. 12 is a schematic illustrating a SCFBP preform created according to the present invention inclusive of a disparate material strut.

As shown in FIG. 12, in which like reference numerals have the meaning previously ascribed thereto, an inventive preform 310 is in the process of being created. This embodiment varies from that detailed with respect to FIG. 8 in that a mechanically supporting strut 312 is stitched into the preform 310. The strut 312 is in certain inventive embodiments a fully density composite material having a higher stiffness per unit area relative to a vehicle component area created by melting the thermoplastic content of preform 110 or curing resin to impregnate the preform 110, a sewable polymeric foam that is either open-celled or close-celled, or an expanded structure. According to some embodiments, the strut 312 is a printed circuit board configured to work with electrical wiring that is included in the fiber bundle according to various embodiments. It is appreciated that a fully densified strut 312 is formed of carbon fiber rich composite or sewing needle pierceable metal, the aforementioned with either smooth surfaces or contoured to improve strength properties through corrugation, dimpling, or imposing a hexagonal pattern embossment therein. Preformed holes 314 in the insert 312 are present in certain inventive embodiments that are sized and spaced to receive thread 120. In an alternate embodiment, the strut 312 is an expanded hexagonal or rhombohedral holes 316 formed of metal or plastics. Aluminum honeycomb grid core mesh is exemplary thereof. In still other inventive embodiments, the strut 312 is placed in a top layer of a preform 310 to avoid having to maintain alignment with holes 314 or otherwise continue to stitch and a second form, such as 110 is inverted and laid on top of the strut 312 to encompass the strut 312 in SCFBP forms. In still other inventive embodiments, a veil is overlaid on the top surface of form 310 to encompass a top layer strut in thermoplastic material. It is appreciated that an insert 312 with a thread hole or a threaded bolt extending therefrom are well-suited as a hard point for fixturing or hingeably attaching the finished vehicle component to the vehicle as a whole.

While the inclusion of a strut 312 in a preform is illustrated in FIG. 12 is formed with only a single sewing head, it is appreciated that a strut 312 is also readily employed with the multiple sewing head embodiment detailed with respect to FIG. 8.

Figure 13A:
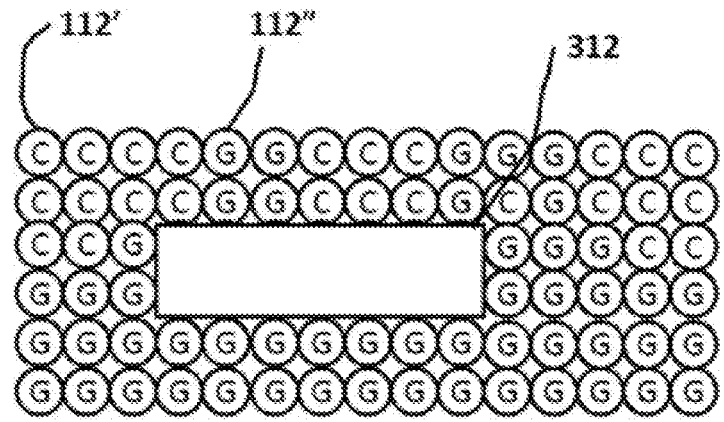
FIG. 13A is a cross section representation of a SCFBP preform with a reinforcing strut in accordance with embodiments of the invention, with the naming convention used in FIG. 9.
Figure 13B:
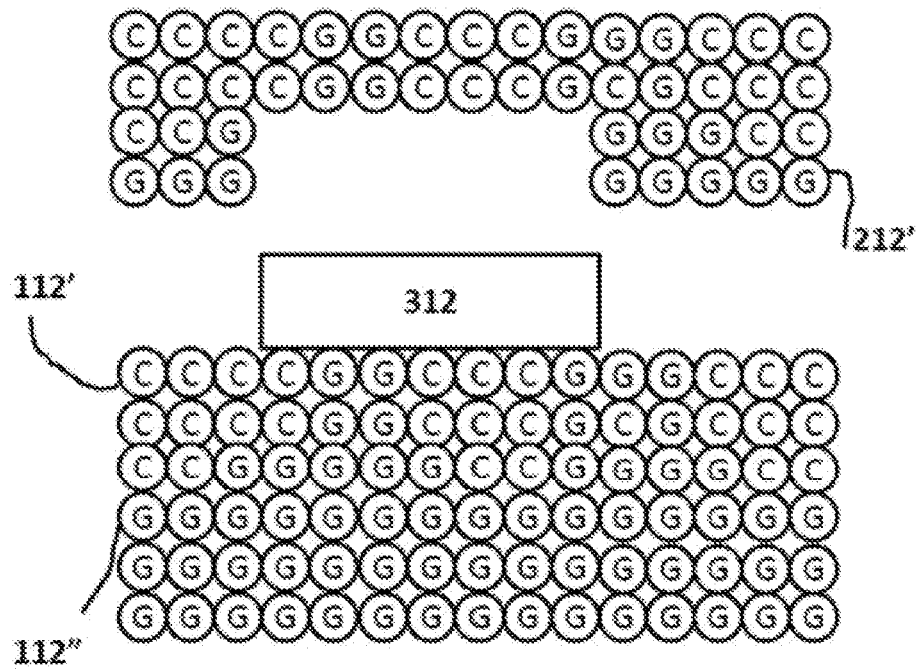
FIG. 13B is a cross-section representation of a SCFBP preform with a top placed reinforcing strut and an inverted preform as shown in FIG. 9 that is complementary thereto.

FIG. 13A is a cross-section representation of the preform 310 with a reinforcing strut 312 using a common naming convention relative to FIG. 9. FIG. 13B is a cross-section representation of the preform 310 with a top placed reinforcing strut 312 and an inverted preform similar to that shown in FIG. 10 and with partial layers 212' that are complementary thereto. No stitches are shown for visual clarity.

Figure 14A:
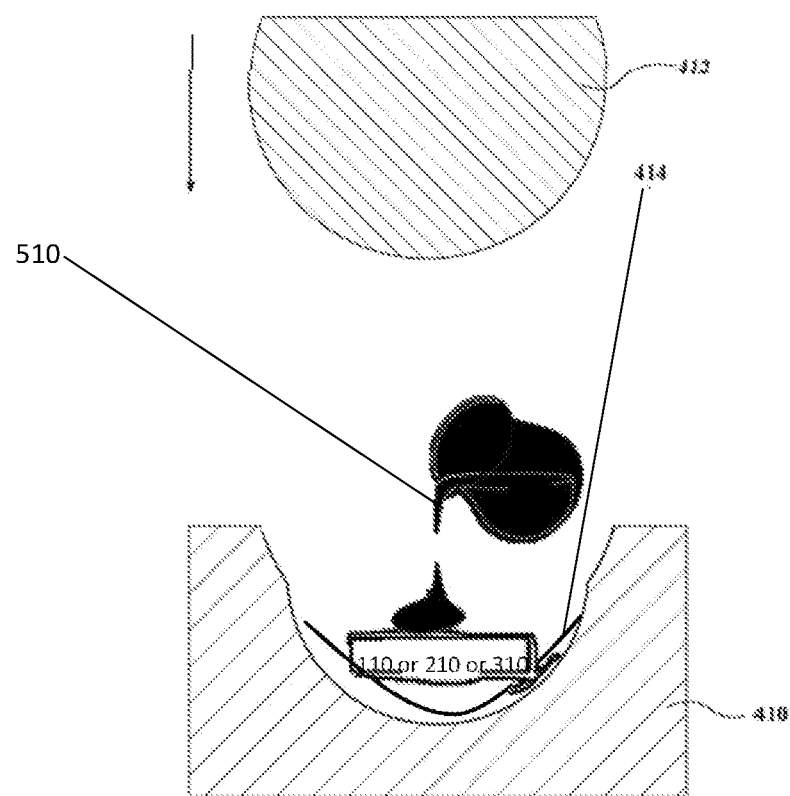
FIGS. 14A-C are a schematic illustrating the steps of processing an inventive SCFBP preform into a component by via liquid compression molding.
Figure 14B:
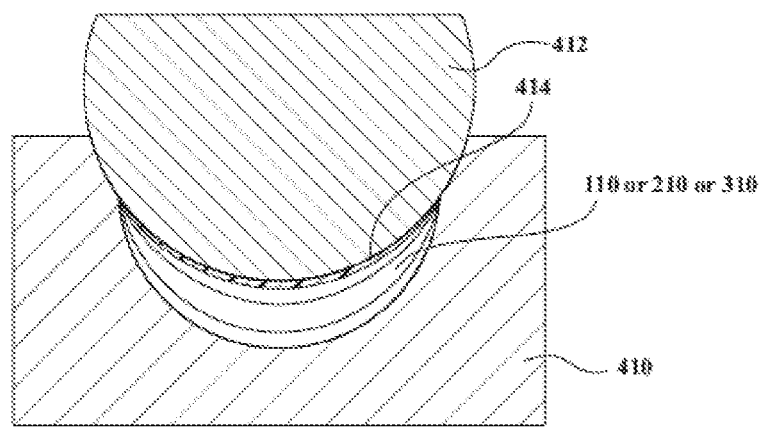
Figure 14C:
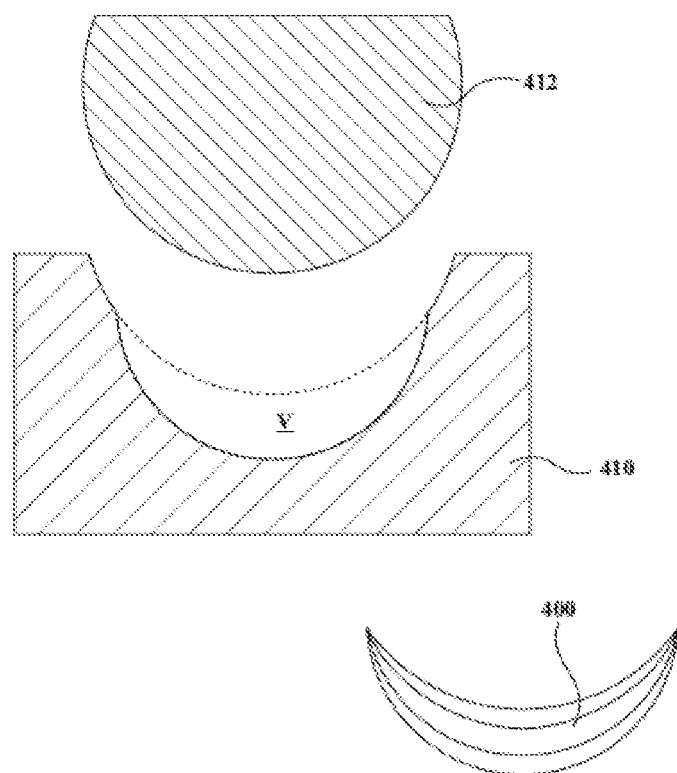

FIGS. 14A-C are a series of schematics showing liquid composite molding (LCM) formation of a component 400. In FIG. 14A, fiber reinforced preform 110 or 210 or 310 or a combination thereof is brought into contact with mold platen 410 and thermoset liquid resin 510 is poured on the preform 110 or 210 or 310 or a combination thereof. In FIG. 14B, an opposing platen 412 is closed to define the volume V. With the application of heat, pressure, cure catalyst, or a combination thereof, the resin infiltrates the preform 110 or 210 or 310 or a combination thereof and cures to form a matrix in a shape defining the component 400. The volume V corresponding in shape to the vehicle component. In a specific inventive embodiment, the preform is overlaid with at least one fabric sheet 414 that is permeated by the resin. Upon opening the volume V, a completed component 400 is removed, as shown in FIG. 14C.

Figure 15A:
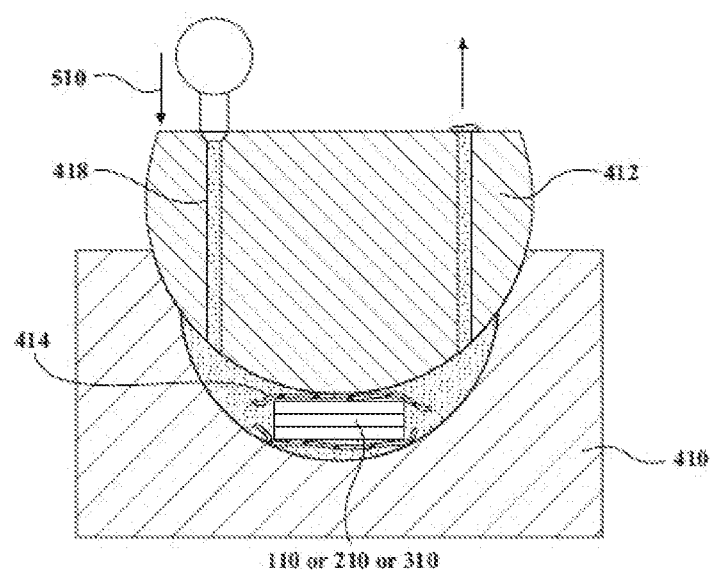
FIGS. 15A-C are a schematic illustrating the steps of processing an inventive SCFBP preform into a component by via resin transfer molding.
Figure 15B:
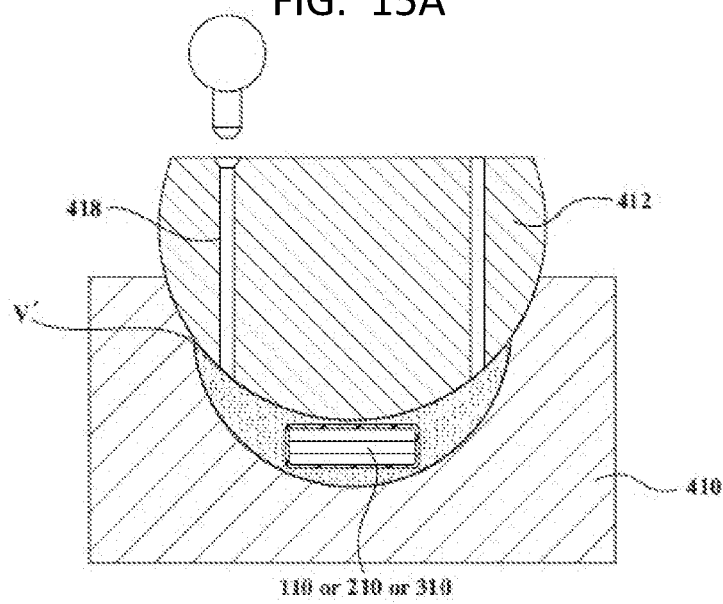
Figure 15C:
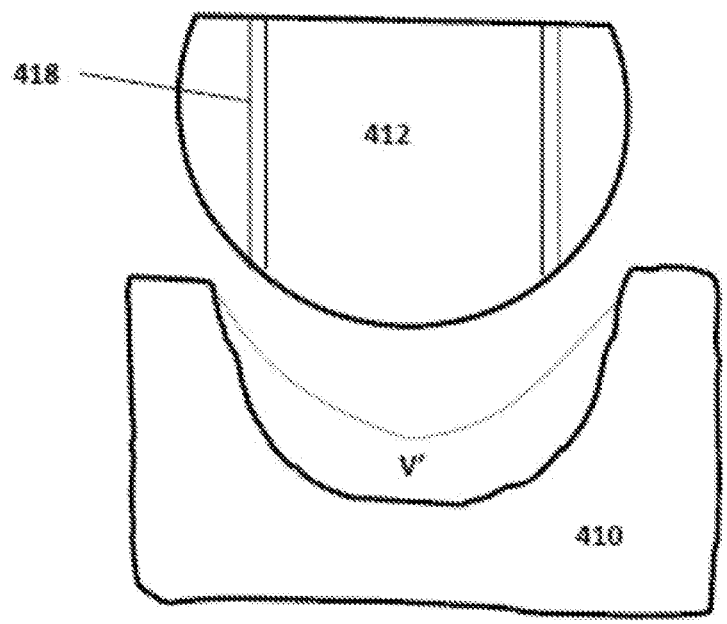
Figure 15C:
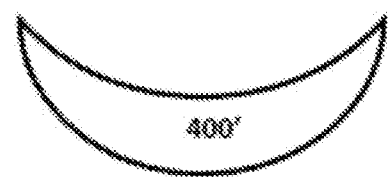

As shown in FIGS. 15A-C, in which like reference numerals have the meaning previously ascribed thereto a series of schematics illustrate RTM formation of a component 400'. In FIG. 15A, preform 110 or 210 or 310 or a combination thereof is brought into contact with mold platen 410 and opposing platen 412 is brought into contact to define the volume V'. The volume V' corresponding in shape to the desired component. A thermoset liquid resin 510 is injected through ports 418 into the volume V' to permeate the preform 110 or 210 or 310 or a combination thereof. In FIG. 15B, cure of the resin occurs with resort to the application of heat, pressure, cure catalyst, or a combination thereof, the resin infiltrates the preform 110 or 210 or 310 or a combination thereof and cures to form a matrix in a shape defining the component 400'. In a specific inventive embodiment, the preform is overlaid with at least one fabric sheet 414 that is permeated by the resin. Upon separating the platens 410 and 412, a completed component 400' is removed, as shown in FIG. 15C.

There are several types of RTM resin delivery systems available on the commercial market that can be employed in the present invention. The pump mechanism can be powered with one or a combination of pneumatic, hydraulic, or gear drive systems. Positive displacement pumping of the resin is well-suited for large complex components 400' illustratively including vehicle applications and is characterized by constant pressure and continuous resin flow while also affording computer control of the injection cycle.

It is appreciated that in some inventive embodiments one can maintain a predetermined hydrostatic resin pressure and adjust and display the temperature for viscosity control as well as for resin flow rate and volume control.

An exemplary RTM process according to the present invention includes, the (1) preform loading for structural applications at 10-65% by total weight percent of the component; (2) applying vacuum to promote resin flow for complete wet out of the preform; (3) resin viscosity less than 1000 cps allows lower injection pressure and faster injection, as does multiple port injection; (4) the mold platens are integrally heated to reduce cycle time and mold handling; (5) resin is previously degassed to minimize porosity and void content, unless a foaming agent is added; (6) hydrostatic pressure is held after resin injection to lower porosity content; and, (7) injection pressure is less than 10 atmospheres to allow a slow-moving resin flow front and to limit resin containing fibers to become inhomogeneous as to density, orientation, or both.

Figure 16A:
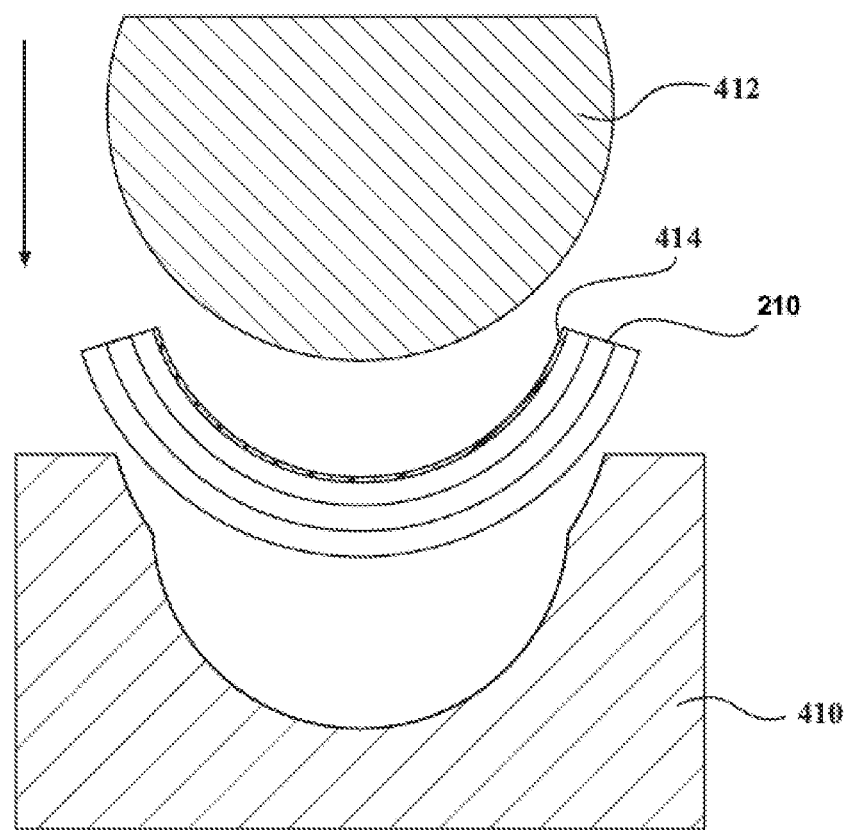
FIGS. 16A-16C are a sequence of schematic steps of processing an inventive SCFBP form into a vehicle component by melting any thermoplastic content of the SCFBP form.
Figure 16B:
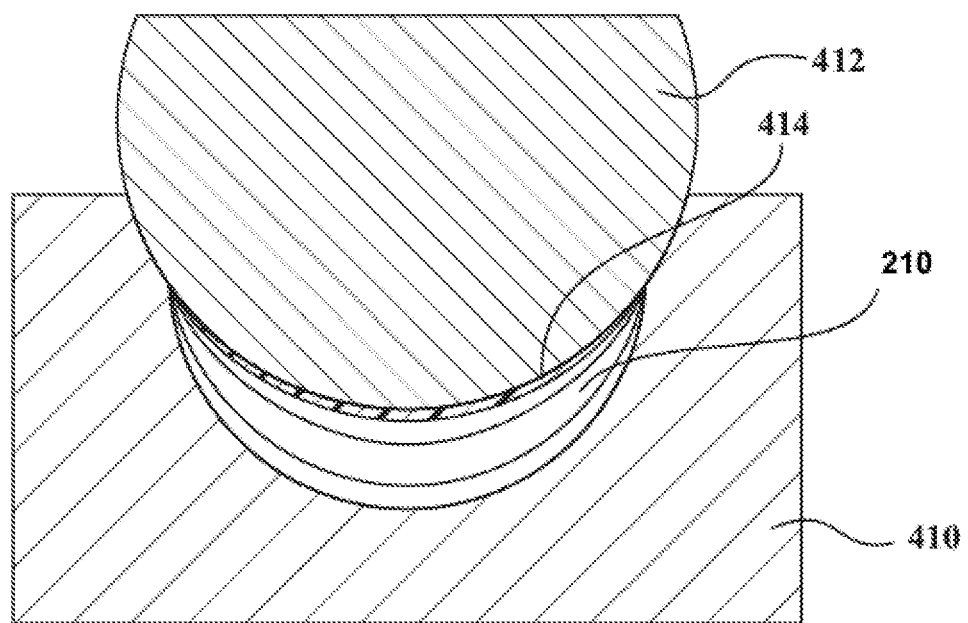
Figure 16C:
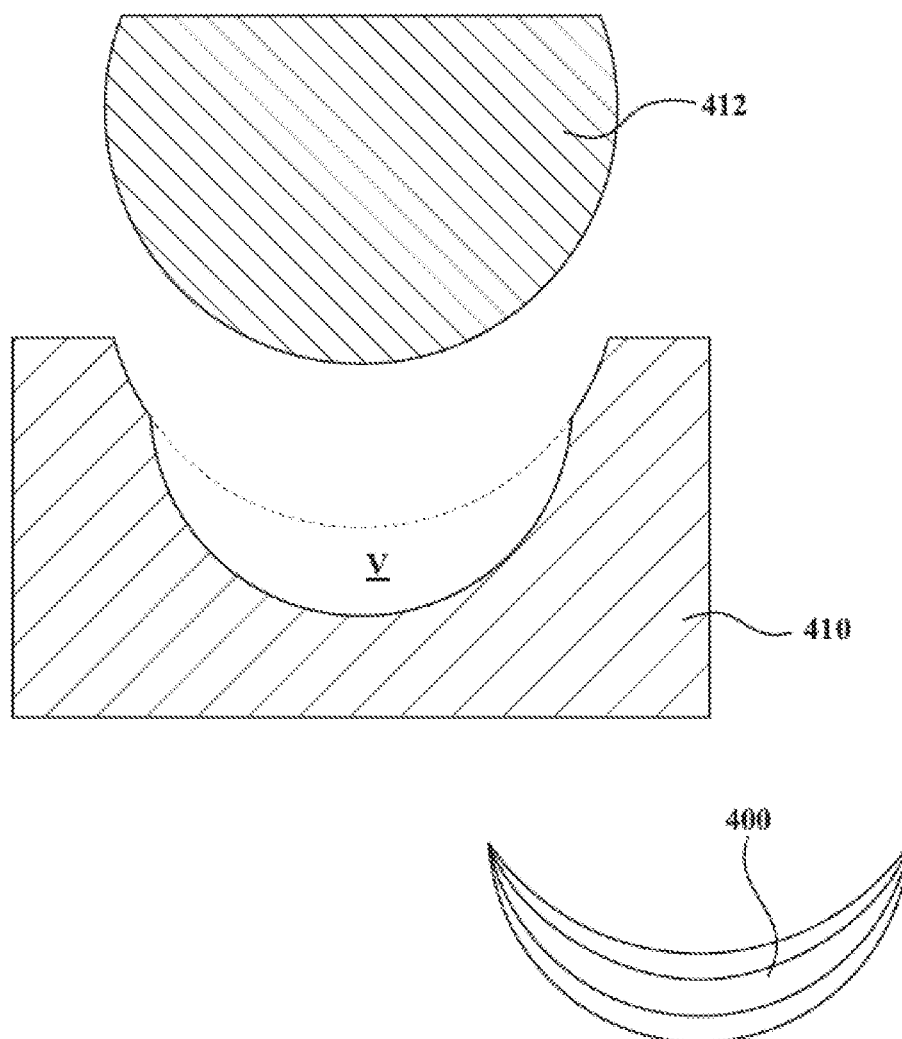

FIGS. 16A-C are a series of schematics showing melt formation of a vehicle component 400. In FIG. 16A, form 210 is intended to be brought into simultaneous contact with opposing mold platens 410 and 412 that define a cavity volume, V. The volume V corresponding in shape to the desired vehicle component. By selectively heating one or both of the platens 410 or 412 to a temperature sufficient to melt the thermoplastic content of the form 210, but not the insulation surrounding any electrical wiring 121 included in the fiber bundle, a vehicle component is formed upon cooling the mass compressed within the platens 410 and 412 by temperature and pressure, as shown in FIG. 16B. In a specific inventive embodiment, a thermoplastic veil 414 is in contact one or both platens 410 and 412 to create a skin on the resulting vehicle component. Upon opening the volume V, a completed vehicle component 400 is removed, as shown in FIG. 16C.

Figure 17:
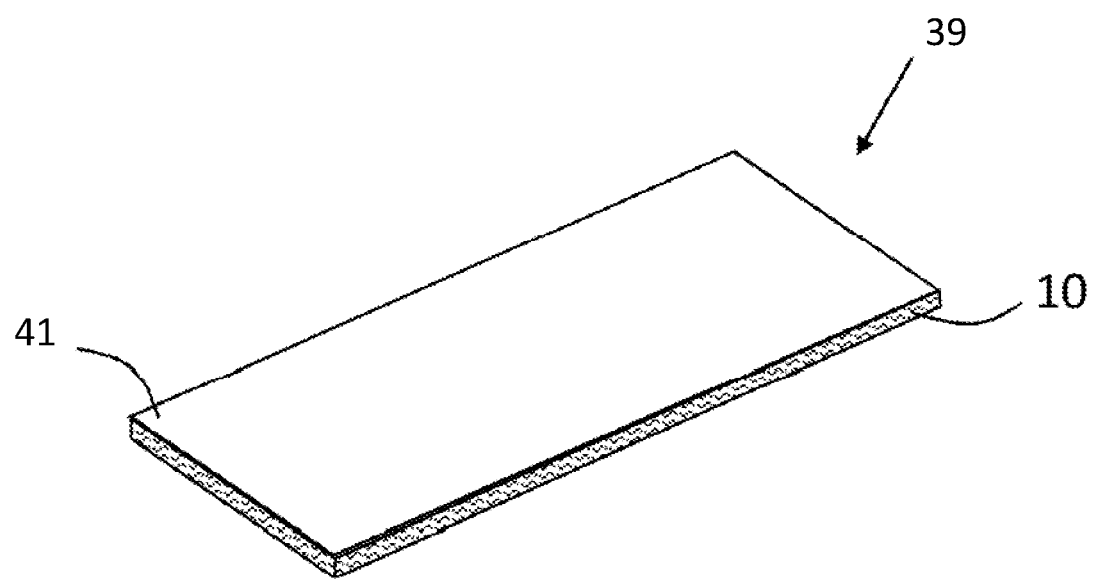
FIG. 17 is a perspective view of a composite material according to an embodiment of the present disclosure.

According to embodiments, the inventive preform further includes additional layers of material to form light-weight, high-strength composite components, as shown in FIG. 17 that may be used as vehicle components. According to embodiments, the fiber preform 10 of the composite material 39 is at least partially impregnated with a thermoset resin. According to various embodiments, the thermoset resin is applied to the fiber preform 10 as a preformed sheet of thermoset resin 41, for example a sheet molding compound (SMC). According to various embodiments, the preformed sheet of thermoset resin contains a matrix of polyester material combined with reinforcing fibers. In various embodiments, the sheet molding compound contains chopped fibers for reinforcement. For example, such chopped fibers illustratively include natural, glass, aramid, carbon (high strength and high modulus) and ceramic fibers.

Figure 18:
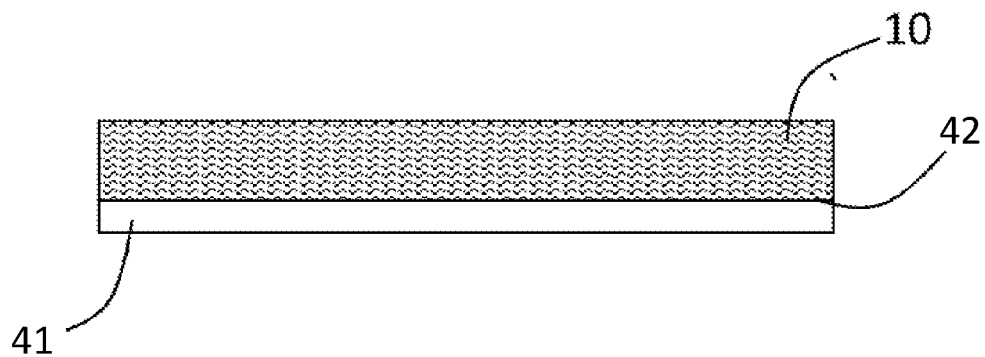
FIG. 18 is a cross-sectional view of a composite material according to an embodiment of the present invention.

The preformed sheet of thermoset resin may initially include a layer of tacky thermoset resin sandwiched between removable protective sheets. Upon removing either of the protective sheets, the tacky thermoset resin is exposed and free to adhere to another surface, for example a first surface 42 of the fiber preform 10, as shown in FIG. 18. The preformed sheet of thermoset resin is highly viscous when in sheet form, such that it retains its shape and position between the protective sheets until it is heated. Once heated to a predesignated temperature, the thermoset resin becomes less viscous such that the resin flows more freely to impregnate the fiber preform. According to some embodiments, the composite material 39 is formed by co-molding at least one sheet of preformed thermoset resin with the fiber preform. The co-molding may include a heated compression mold. The heat of the co-molding process causes the thermoset resin to become less viscous and to flow into the fiber bundle of the fiber preform. The composite material 39 may be molded into vehicle components.

Figure 19:
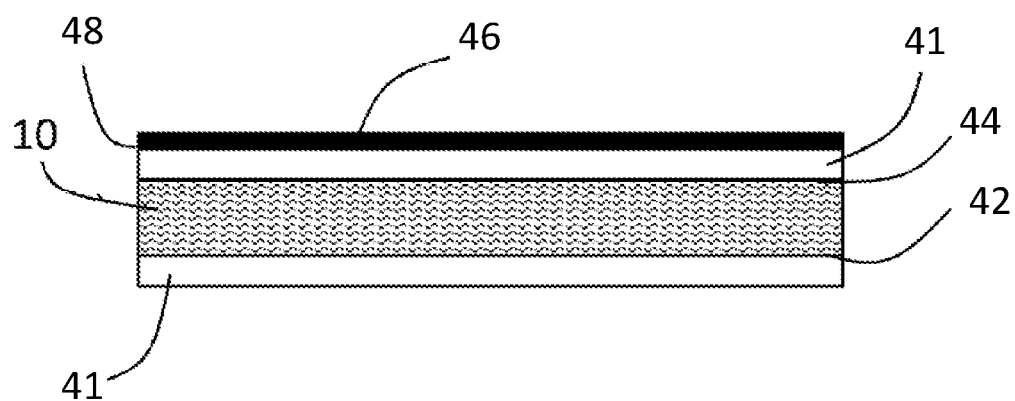
FIG. 19 is a cross-sectional view of a composite material according to another embodiment of the present invention.

In some embodiments of the present disclosure, such as that shown in FIG. 19, a second sheet of preformed thermoset resin 41 is layered on a second side 44 of the fiber preform 10. As described above, when heated to the predetermined temperature, the thermoset resin becomes more viscus and flows to impregnate the fiber preform 10. The amount of the fiber preform 10 that is impregnated with thermoset resin can accordingly be tuned based on the number of sheets of preformed thermoset resin that are applied to the fiber preform. In some embodiments, the substrate 12 is removed from the fiber preform, prior to layering of the sheet or sheets of preformed thermoset resin to allow the thermoset resin to more easily impregnate the fiber preform.

Figure 20:
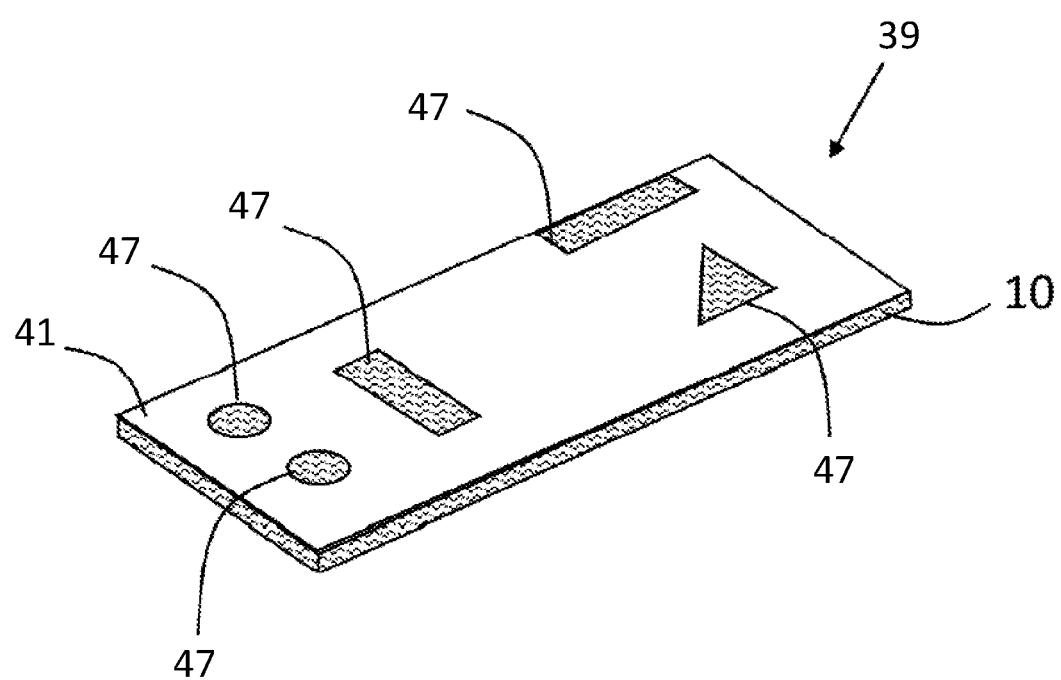
FIG. 20 is a perspective view of a composite material according to another embodiment of the present disclosure.

According to some forms, such as that shown in FIG. 20, the sheet or sheets of thermoset resin define a cutout 47 in the resin. The cutouts may be any suitable shape or orientation. The cutouts 47, provide areas free of thermoset resin such that when the sheet of preformed thermoset resin is applied to the fiber preform 10 and the thermoset resin is heated and the resin impregnates the fiber preform, a portion of the fiber preform that is within the area of the cutout 47 remains free of resin.

Referring again to FIG. 19, some forms of the inventive composite material include a protective layer 46 on an outside surface 48 of the sheet of preformed thermoset resin 41. This protective layer 46 may be the protective layer initially provided with the sheet of preformed thermoset resin or the protective layer 46 may be added subsequently. When the protective layer 46 is co-molded with the fiber preform 10 and thermoset resin 41, the protective layer 46 provides a treatable surface finish for the composite material. The treatable surface may be a smooth surface that is suitable for painting, i.e., a Class A automotive surface.

The present disclosure further provides a method for making a component formed of the composite material described above. As shown in FIGS. 21A-21D, the method includes placing at least one sheet of preformed thermoset resin 41 into a mold 60. Placing the sheet of preformed thermoset resin 41 into the mold may include removing the initial protective sheet from the thermoset resin to expose the tacky resin such that it may adhere to another surface. This may be done before or after the sheet of preformed thermoset resin in placed into the mold 60. The method continues by placing the fiber preform 10 onto the at least one sheet of preformed thermoset resin 41. It is envisioned that the sheet of preformed thermoset resin 41 and the fiber preform 10 can optionally be layered together prior to being jointly placed into the mold. According to various embodiments, the method includes removing the substrate 12 from the fiber preform 10 so that the thermoset resin may flow more easily into the fiber preform.

Figure 21A:
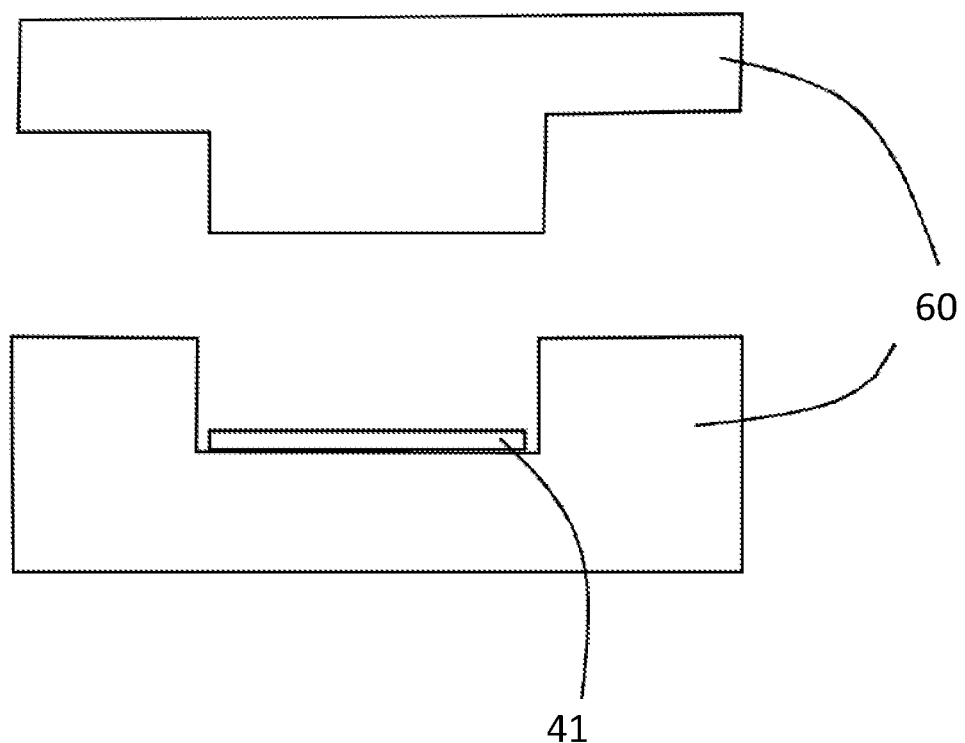
FIGS. 21A-21D are cross-sectional schematic views of steps of a method for forming components formed of the composite material according to the present disclosure.
Figure 21B:
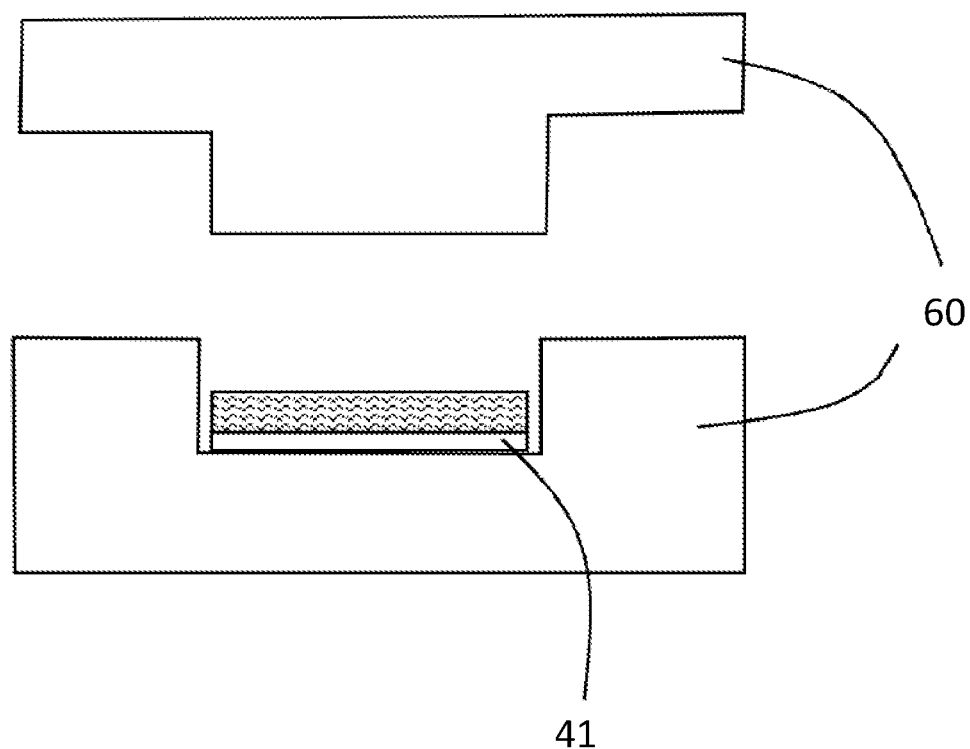
Figure 21C:
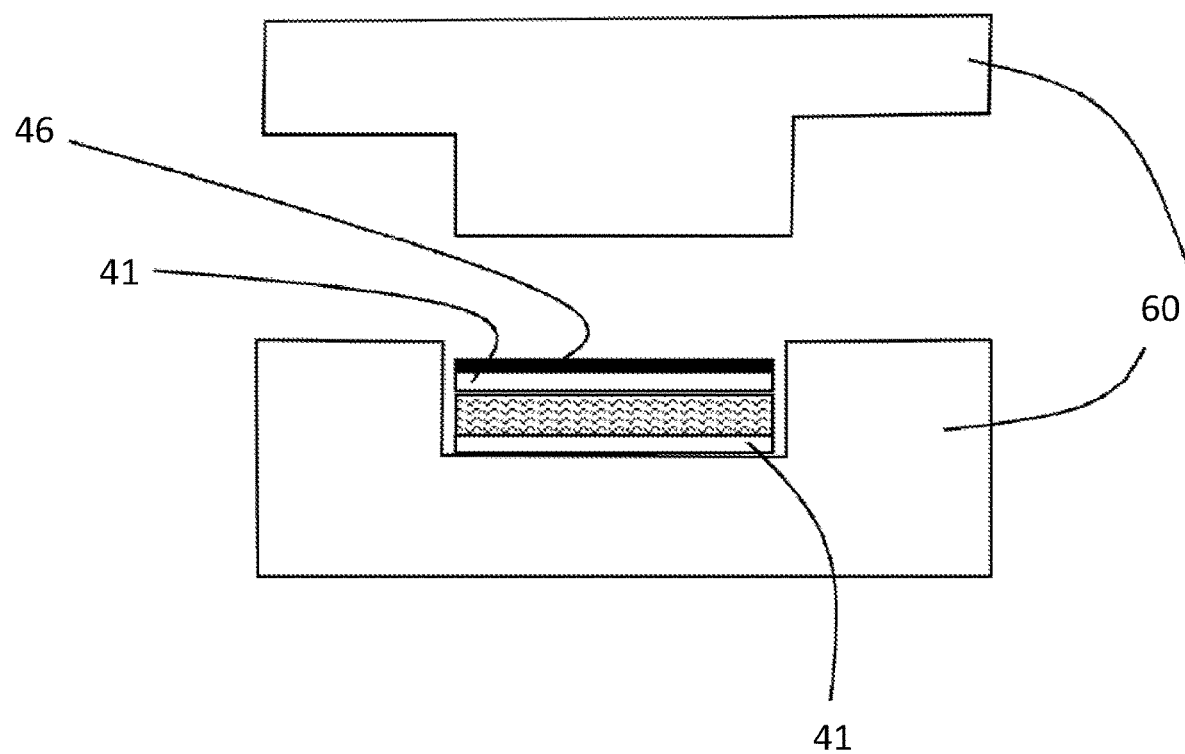

According to various embodiments and based on the design parameters of the final composite material 39 part, a second sheet of preformed thermoset resin 41 is applied to the fiber preform 10, as shown in FIG. 21C. It is understood that any sheet of preformed thermoset resin 41 that is used in the inventive process may include a protective sheet 46 that may be co-molded with the thermoset resin 41 and the fiber preform 10 to give the final composite material 39 a treatable surface finish, for example as shown on the second sheet of preformed thermoset resin 41 shown in FIG. 21C.

Figure 21D:
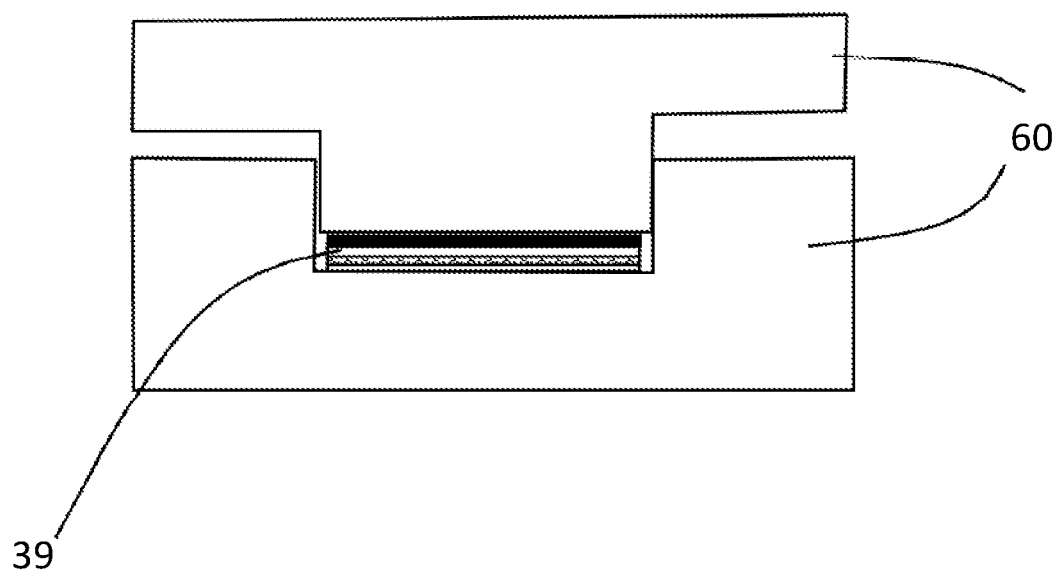

The method continues by closing the mold 60 as shown in FIG. 21D. according to various embodiments, the mold 60 is a tape molding mold, accordingly eliminating the need to purchase separate overmolding equipment to carry out the inventive process. The mold 60 applies heat and compression to the materials layered in the mold 60. When heat is applied to the materials in the mold 60, the thermoset resin 41 becomes more viscous and flows into the fiber preform to impregnate the fiber preform with thermoset resin.

Figure 22:
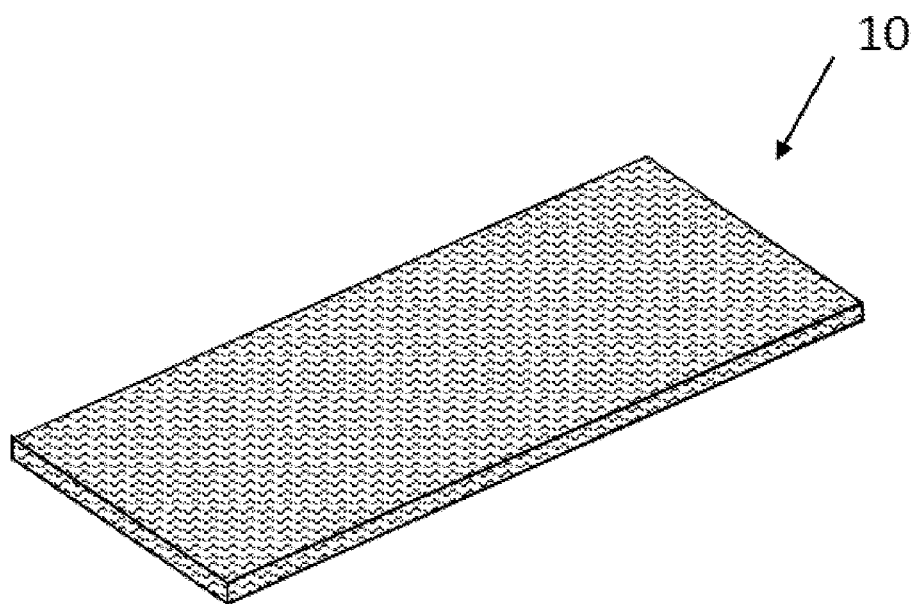
FIG. 22 is a perspective view of a multi-layered fiber preform according to an embodiment of the present disclosure.

Often, it is desired that the composite materials formed using a fiber preform of the present disclosure have a three-dimensional shape, for example a curve, an angle, or some other non-planar configuration. Additionally, it is often desired to produce a composite part that has a corrugated core to increase strength of the composite part. To manufacture three-dimensional composite material parts, a fiber preform is placed in a mold having a three-dimensional shape corresponding to the shape of the desired final composite material part. It has been found that typical fiber preforms formed using a selective comingled fiber bundle positioning process are difficult to place in such three-dimensional molds due in part to the floppy or limp nature of the two-dimensional fiber preform. Achieving a suitable fit between the generally two-dimensional fiber preform 10, as shown in FIG. 22, and a three-dimensional overmolding mold is difficult and often results in improper fit in the mold, voids between the insert and the mold surface or wrinkles in the insert. Such voids, wrinkles, and other undesirable alignment issues lead to concentrations of resin, weak points, poor resin infiltration, and cracking in the final composite material parts.

Figure 24:
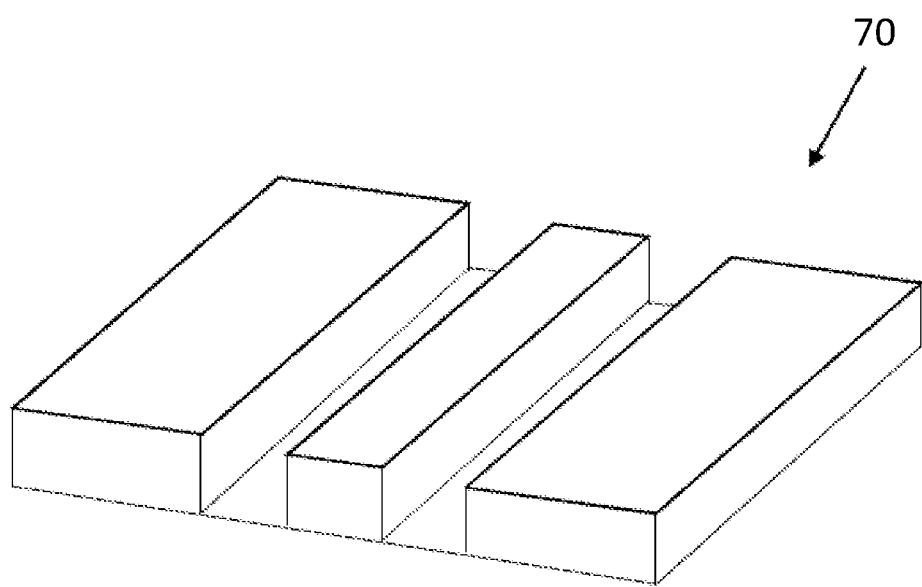
FIG. 24 is a perspective view of a pre-shaping mold according to embodiments of the present disclosure.
Figure 25:
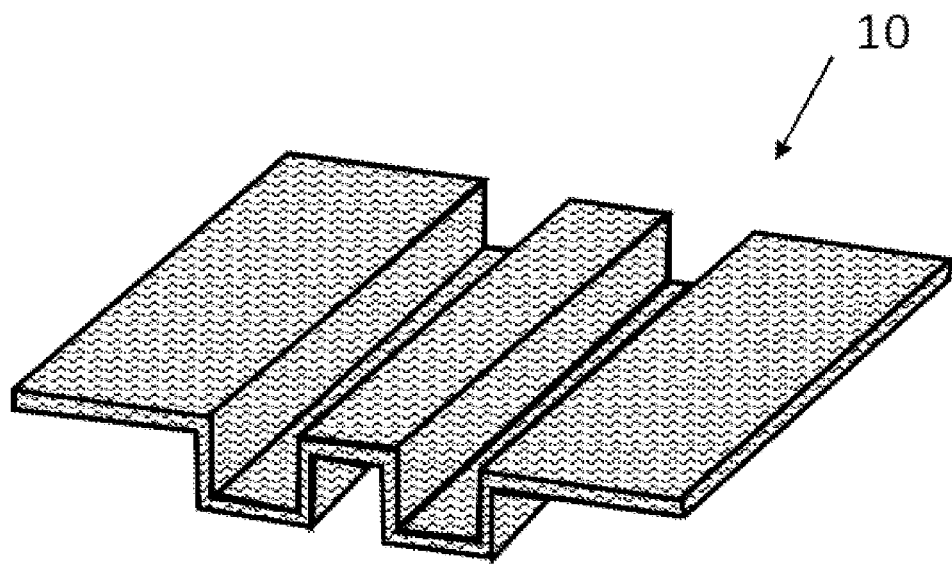
FIG. 25 is a schematic view of a fiber preform having a three-dimensional shape.
Figure 26:
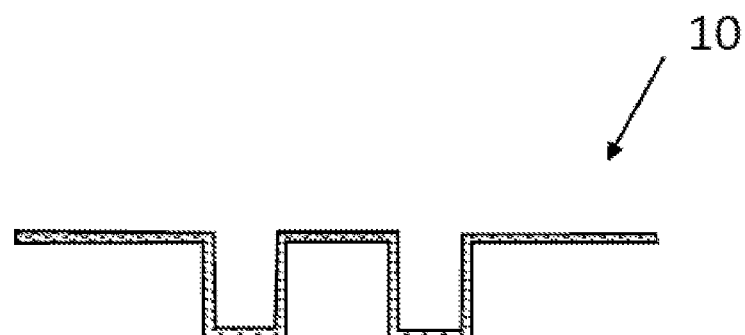
FIG. 26 is a cross-sectional schematic view of the fiber preform of FIG. 25.
Figure 27A:
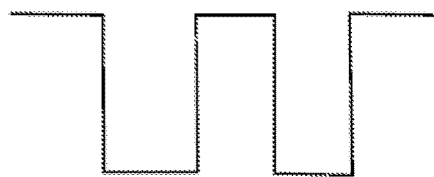
FIGS. 27A-27F show exemplary cross sectional profile shapes of a fiber preform according to embodiments of the present disclosure.
Figure 27B:
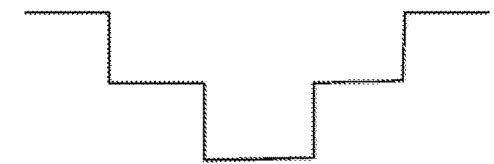
Figure 27C:
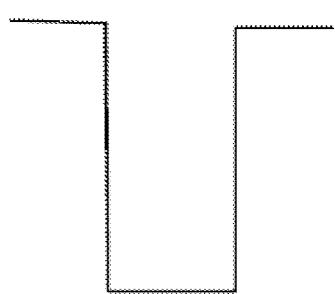
Figure 27D:
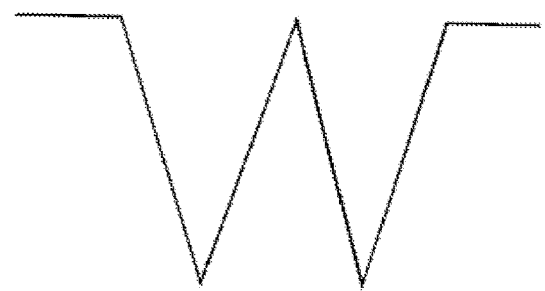
Figure 27E:
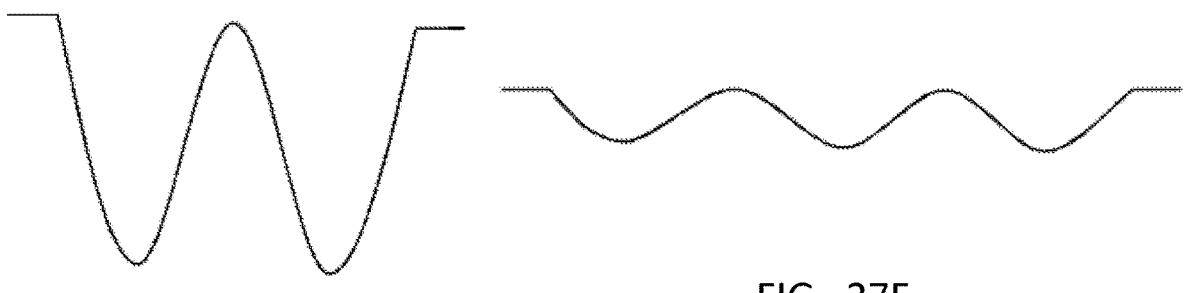
Figure 27F:
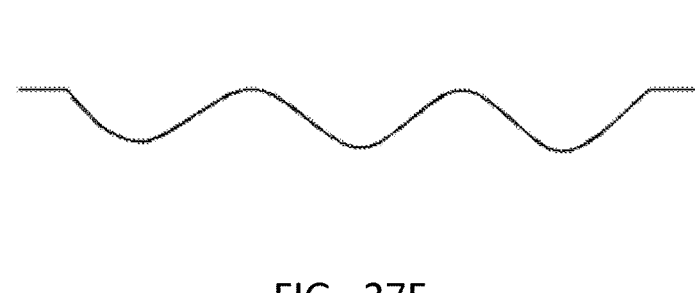

Embodiments of the present invention provide a fiber preform capable of being pre-shaped into a three-dimensional design before being placed in the three-dimensional composite material mold. According to various forms of the present invention, the fiber preform 10 may be placed on a pre-shaping mold 70 such as those schematically shown in FIGS. 23 and 24, however various other pre-shaping mold 70 shapes and configurations are appreciated. Gravity may assist with seating the fiber preform 10 on the pre-shaping mold 70. Providing a three-dimensional fiber preform 10 such as those shown in FIGS. 25 and 26 is beneficial in that it helps to alleviate the above-identified problems. The non-planar three-dimensional shape of the fiber preform 10 corresponds to the shape of an overmolding, i.e. resin transfer molding (RTM), Liquid composite molding (LCM), thermoplastic overmolding, or injection molding mold with which the fiber preform is to be used to form a composite part. As shown in FIGS. 25 and 26, the non-planar three-dimensional shape is a square wave profile, which may be used as a corrugated core for a composite part. Other suitable profile shapes are also contemplated including those shown in FIGS. 27A-F.

According to embodiments, heat may be applied to one or both sides of the fiber preform 10 by heat emanating from the pre-shaping mold 70 or from another source. According to some embodiments, in which a thermoplastic thread is used to attached the fiber bundle to the substrate, when the fiber preform 10 is heated to the melting temperature, thermofusion of the thermoplastic thread of the plurality of stitches takes place, and the thermoplastic thread melts and fuses to itself where the thread intersects itself, thereby forming tacking points throughout the fiber preform 10 such that the fiber preform 10 conforms to and maintains a three-dimensional shape corresponding to that of the pre-shaping mold 70.

According to various forms of the present invention, the fiber preform 10 further includes a curable material applied to a portion of at least one preform layer 11 to retain the fiber preform 10 in a non-planar three-dimensional shape, as shown in FIGS. 25 and 26. According to various forms of the present invention, the curable material is a high temperature epoxy, a high strength hair spray, an adhesive, a paint, or any combination thereof. Other curable materials capable to holding or retaining the fiber preform in a non-planar three-dimensional share are also contemplated. Regarding additional suitable curable materials contemplated by the present invention, "Preparing of Thermoset Rubbery Epoxy Particles as Novel Toughening Modifiers for Glassy Epoxy Resis" by Jansen et al., which is hereby incorporated by reference. The curable material may be applied as sparingly as needed such as in a predetermined pattern of dots and/or lines, or according to some embodiments, applied to an entire surface of the fiber preform. Alternatively, the fiber preform may be submerged in the curable material to coat all surfaces of the fiber preform. In some embodiments, the curable material is sprayed on by a machine or a human. In other embodiments, the curable material is painted on by a machine or human. Combinations of spraying, painting, and submerging are also contemplated herein.

Figure 23:
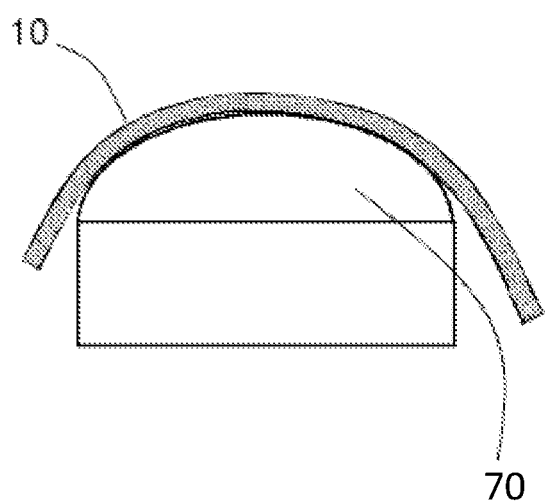
FIG. 23 is a schematic view of a three-dimensional fiber preform according to an embodiment of the present invention on a preliminary shaping mold.

According to some embodiments, pre-shaping the preform includes placing the fiber preform 10 on a pre-shaping mold 70 such as that schematically shown in FIG. 23. Gravity may assist with seating the fiber preform 10 on the pre-shaping mold 70. Upon heating the fiber preform 10 to a melting temperature at which point thermofusion of the thermoplastic thread of the plurality of stitches takes place, the thermoplastic thread melts and fuses to itself where the thread intersects itself, i.e. the tacking points throughout the fiber preform 10 such that the fiber preform 10 conforms to and maintains a three-dimensional shape corresponding to that of the pre-shaping mold 70.

Figure 28A:
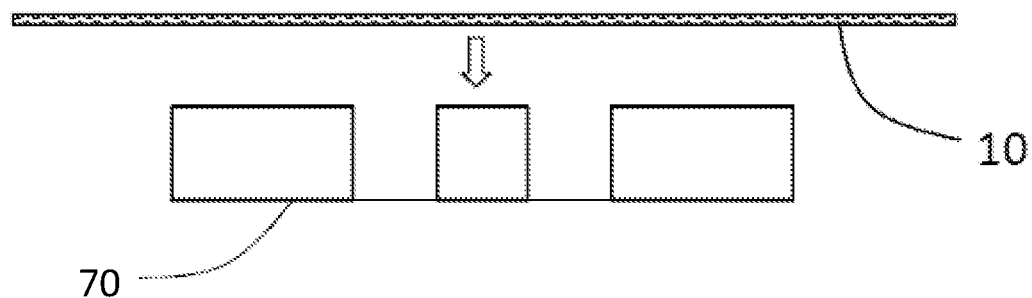
FIGS. 28A-28G are schematic drawings showing a process for forming a fiber preform having a three-dimensional shape according to the present invention.
Figure 28B:
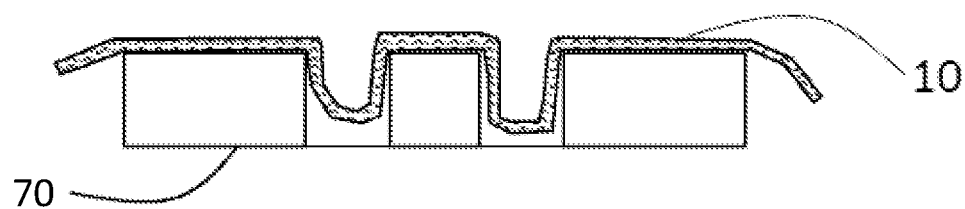

FIGS. 28A-28G show a method for forming a fiber preform 10 having a three-dimensional shape according to the present invention. As shown in FIG. 28A, the method includes providing a two-dimensional preform material in a shaping mold 70. An isometric view of an exemplary shaping mold 70 can be seen in FIG. 24. Those having ordinary skill in the art will appreciate that the shaping mold 70 can have alternate geometries based on the desired non-planar, three-dimensional shape of the fiber preform. The exemplary shaping mold 70, shown in FIGS. 28A-28G includes two square shaped channels extending through the shaping mold. Such a shaping mold is useful in producing a fiber preform having a square wave profile that may be used as a corrugated core for an overmolded composite material. As shown in FIG. 28B, simply draping the fiber preform 10 on the shaping mold does not ensure a proper fit or alignment within the shaping mold 70.

Figure 28C:
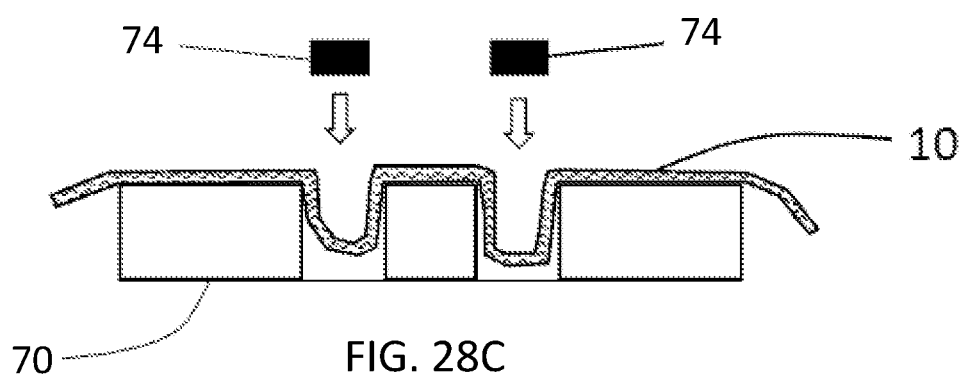
Figure 28D:
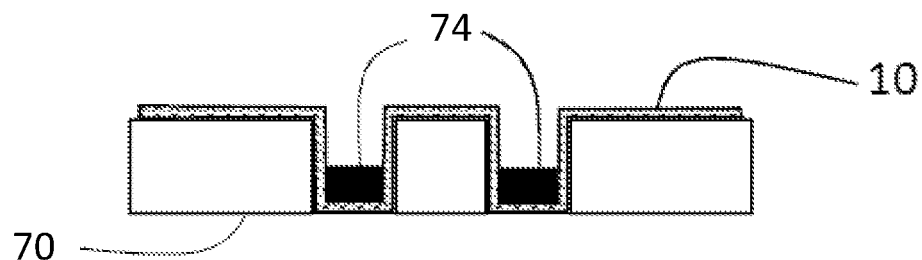

The method continues by urging the fiber preform 10 to conform to the three-dimensional shape of the shaping mold 70. As shown in FIG. 28C, the urging step includes placing a shaping guide 74 on the fiber preform 10 to press the fiber preform 10 into the three-dimensional shape of the shaping mold 70. In some embodiments of the present invention, the urging step includes applying a vacuum to the fiber preform 10 to draw the fiber preform into conformity with the shaping mold 70. The vacuum may be located under the shaping mold and apply suction to the fiber preform via holes in the base of the shaping mold. It is also envisioned that shaping guides may be used in combination with a vacuum. As shown in FIGS. 29A-29F, various forms of shaping guides 74 are contemplated including blocks, screens, horizontal plates, rods or bars, angled plates, and vertical plates respectively. The shaping guides 74 generally have geometries corresponding to the voids in the shaping mold 70. According to some embodiments, the shaping guides 74 may be placed on the fiber preform within the shaping mold 70 and clamped to the shaping mold 70. The shaping guides 74 may be formed of any suitable material capable of urging the fiber preform into the shaping mold. Various geometries of the shaping guides 74 may be used based on the design parameters of the fiber preform including the thickness of the fiber preform and whether it is desired to apply the curable material to more or less of the fiber preform. For example, when using a shaping guide such as those shown in FIGS. 29A and 29C, the curable material may be blocked from coating a portion of the fiber preform that is covered by the shaping guide. When using shaping guides such as those shown in FIGS. 29B, 29D, 29E, and 29F, more of the surface of the fiber preform is exposed and therefore able to be coated with the curable material.

Figure 28E:
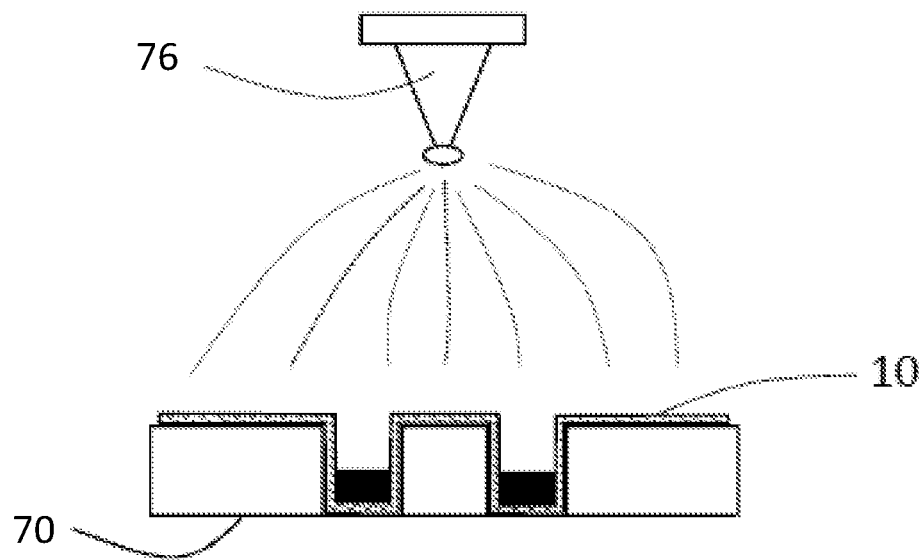

Once the fiber preform 10 has been urged into conformity with the three-dimensional shape of the shaping mold 70, the method continues by applying a curable material to the fiber preform. Applying the curable material to the fiber preform causes the fiber preform to retain the three-dimensional shape of the shaping mold 70 when the curable material cures. According to some embodiments, the substrate 12 of the fiber preform is removed prior to applying the curable material. The curable material may be any of a high temperature epoxy, a high strength hairspray, an adhesive, a paint, or a combination thereof. As shown in FIG. 28E, the curable material is sprayed on to the fiber preform 10 by a sprayer 76. The sprayer may be operated by a human or a machine. In other embodiments, the curable material is painted on to the fiber preform by a human or a machine. In some embodiments, the curable material is applied to at least one surface of the fiber preform. Alternatively, the fiber preform may be submerged in the curable material. It is envisioned that submerging the fiber preform in the curable material may include submerging the shaping mold and shaping guides in the curable material as well. Those having ordinary skill in the art will understand that the curable material may prevent resin to infiltrate the fiber preform in an overmolding process, therefore it is desirable in some embodiments to apply the curable material only on one surface of the fiber preform, in only predesignated areas of the fiber preform, or sparingly.

Figure 28F:
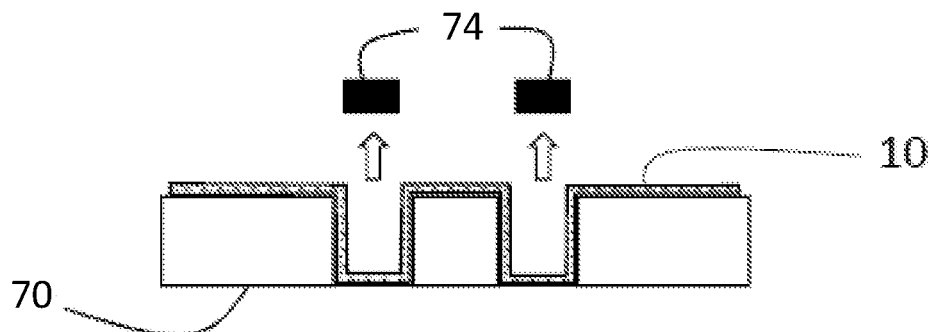
Figure 28G:
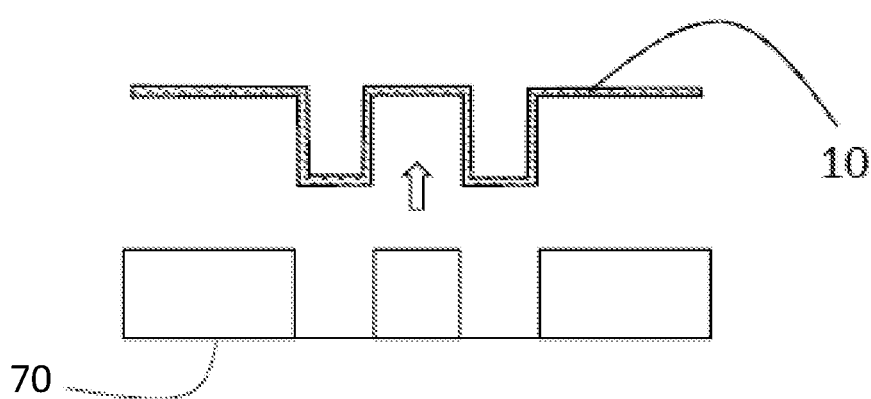
Figure 29A:
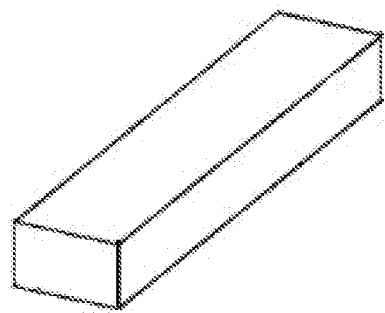
FIGS. 29A-29F show perspective views of various forms of shaping guides according to embodiments of the present disclosure.
Figure 29B:
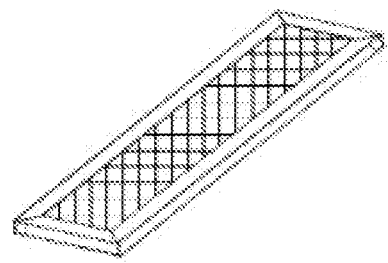
Figure 29C:
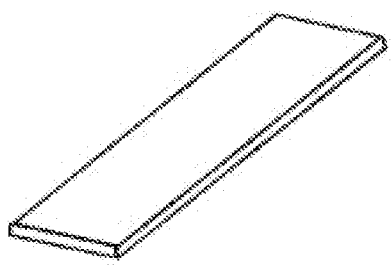
Figure 29D:
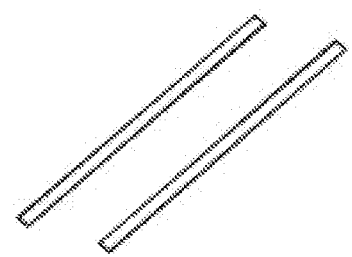
Figure 29E:
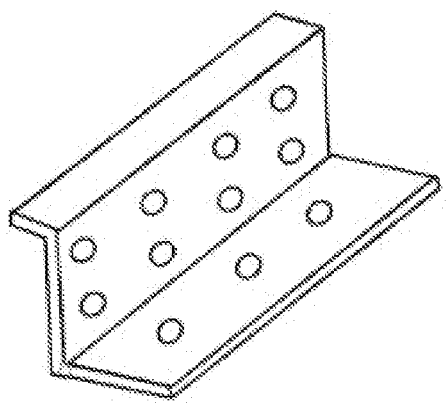
Figure 29F:
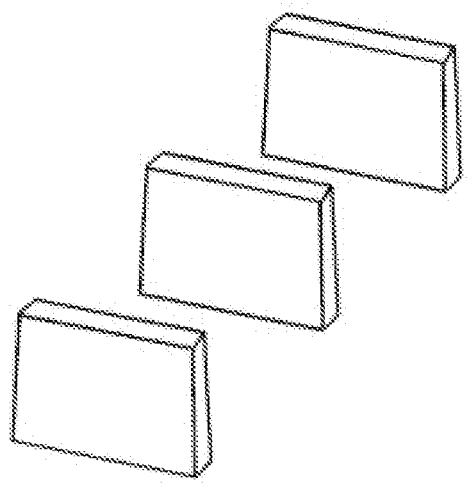

As shown in FIG. 28F, the method continues by removing the shaping guides 74 in instances when shaping guides were used. Finally, as shown in FIG. 28G, the fiber preform 10 is removed from the shaping mold 70 once the curable material has cured. As shown in FIGS. 25 and 26, the fiber preform 10 retains the three-dimensional shape of the shaping guide 70. The three-dimensional fiber preform 10 may then be used in an overmolding process such as RTM or LCM to make a composite material.

Figure 30:
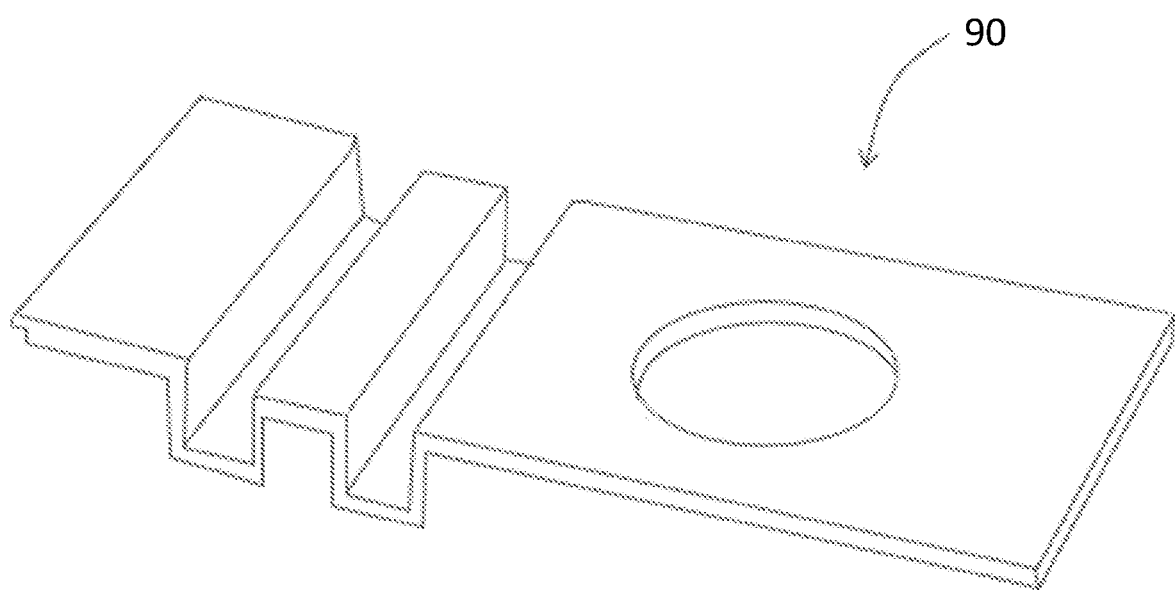
FIG. 30 is a perspective view of a composite material vehicle component overmolded in a resin matrix according to an embodiment of the present disclosure.
Figure 31:
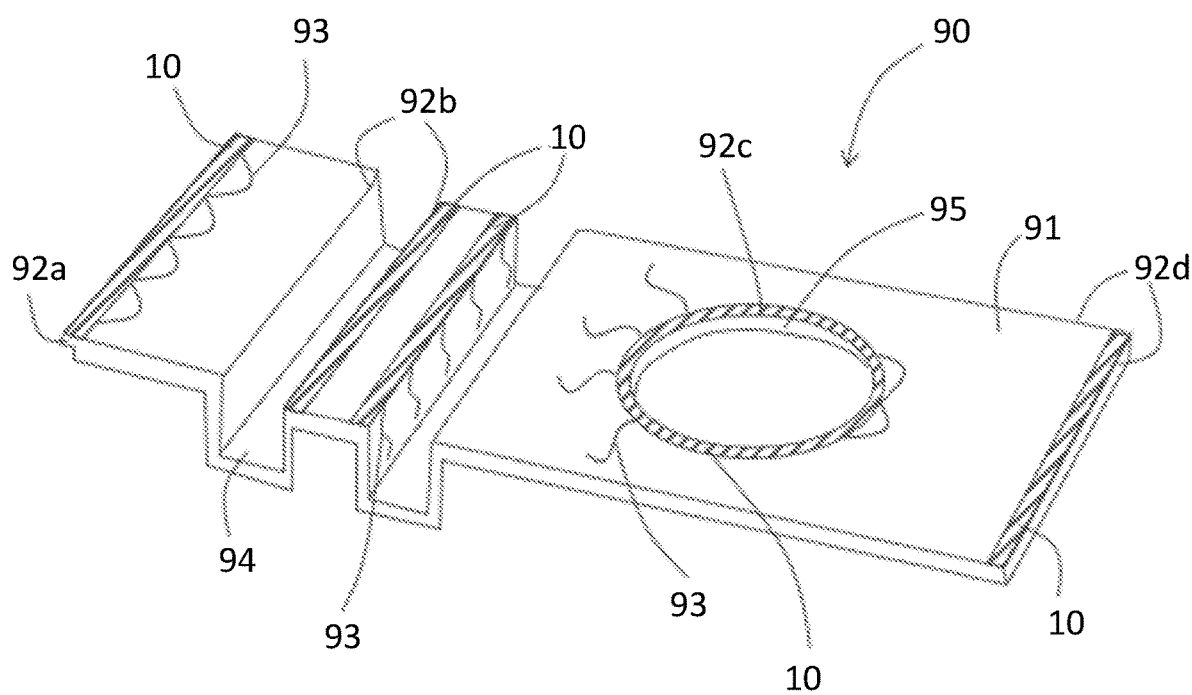
FIG. 31 is perspective view of elements of the vehicle component of FIG. 30 assembled together prior to being overmolded in a resin matrix.

According to embodiments of the present disclosure, an inventive fiber preform 10, as described above, is used to reinforce stress prone areas of a composite vehicle component. Referring to FIG. 30, a composite material vehicle component 90 according the present invention is shown overmolded in a resin matrix. As best seen in FIG. 31, the vehicle component 90 includes a core 91 and at least one reinforcing preform 10. Together, the core 91 and the reinforcing preform are overmolded in a resin matrix to form a complete composite material vehicle component.

Vehicle components according to the present disclosure illustratively include a vehicle hood, a vehicle trunk door, a vehicle door panel, a vehicle bolster, vehicle post, a vehicle chassis, a pickup box, a cab load floor, a vehicle floor, a tailgate, a deck lid, a roof, a fender, a wheel well, and body panels; heavy truck components that illustratively include the aforementioned and sleeping compartment sections, farm equipment components that illustratively include drive cab body components; motor home floors and wall panels; and marine products such as decking, sound damping panels, and cockpit sections; and train car components illustratively including seats, flooring, roof sections, and walls.

According to embodiments of the present disclosure, the resin matrix is a curable thermoset resin. Thermoset resins operative herein illustratively include vinyl esters, polyurethanes, epoxies, polyureas, benzoxazines, maleimides, cyanate esters, phenolics and polyimides. Each alone, a combination thereof, or in the presence of a foaming agent. The resin matrix may be used both neat and loaded with reinforcing particulate and fiber fillers, or a combination thereof, depending on desired characteristics of the final component.

As shown in FIG. 31, the core 91 has a geometry with a at least one edge 92a, 92b, 92c, 92d. The geometry shown in the exemplary figures are for illustration purposes only. One of ordinary skill in the art will readily recognize that the core may be formed in any shape and have a variety of geometries, generally corresponding to a predesigned vehicle component to be formed from the composite material and process described herein. The edge of the core 91 may be an edge 92a at narrowed section of the core 91 forming a flange, an edge 92b of a corner or an opening to a corrugation 94, an edge 92c surrounding or abutting a through opening 95 in the core 91, a boundary edge 92d of the core 91, or any other area prone to stress concentration.

According to embodiments of the present disclosure, the core 91 is formed of a sheet molding compound. Sheet molding compound is a ready to mold material containing a matrix of polyester material combined with reinforcing fibers. In various embodiments, the sheet molding compound contains chopped fibers for reinforcement. For example, such chopped fibers illustratively include natural, glass, aramid, carbon (high strength and high modulus) and ceramic fibers. Embodiments of the present disclosure include the core having a geometry or shape that has a high aspect ratio, i.e. a ratio of width to height of an object, which illustratively includes flanges, corners, protrusions, and corrugations.

Embodiments of the present disclosure provide that the geometry or shape of the core 91 is formed by a compression molding process. Compression Molding is a method of molding in which the molding material, for example sheet molding compound, is generally preheated and placed in an open, heated mold cavity. The mold is closed with a top force or plug member, pressure is applied to force the molding material into contact with all mold areas, while heat and pressure are maintained until the molding material has cured. Compression molding is a high-volume, high-pressure method suitable for molding complex, high-strength, large, intricate parts.

As shown in FIG. 31, at least one insert reinforcing preform 10 of the vehicle component 90 is positioned along at least one of the edges 92a-92d of the core 91 to strengthen and reinforce the edge or edges 92a-92d. One having ordinary skill in the art will readily understand that, based on desired performance characteristics and design specifications, a vehicle component according to the present disclosure may have anywhere from a single edge to all of the edges of the core reinforced with an insert reinforcing preform 10.

According to embodiments of the present disclosure, an insert reinforcing preform 10 is formed of a fiber bundle 14 of reinforcing fibers and or matrix fibers arranged in a shape corresponding to the edge 92*a*-92*d* which the insert reinforcing preform 10 is to reinforce. For example, if an insert reinforcing preform 10 is to reinforce a linear edge such as at a flange edge 92*a*, an edge 92*b* of an opening to a corrugation, or a boundary edge 92*d* of the core 91, the insert reinforcing preform 10 is formed of a fiber bundle 14 arranged in a generally linear shape to correspond to the linear edge 92*a*, 92*b*, 92*d*. It is also contemplated that when the edge to be reinforced has a non-linear shape, such as the edge 92*c* of a through opening 95 or other non-linear shapes, the insert reinforcing preform 10 is formed of a fiber bundle 14 arranged in a corresponding generally non-linear shape.

As described above, embodiments of the present disclosure provide that the fiber bundle 14 is made of reinforcing fibers, such as those made of 100% carbon, 100% glass, or 100% aramid fibers, or a combination thereof. According to some embodiments, the fiber bundle 14 includes matrix fibers in addition to the reinforcing fibers. The matrix fibers being of a thermofusible nature may be formed from a thermoplastic material such as, for example, polypropylenes, polyamides, polyesters, polyether ether ketones, polybenzobisoxazoles, polyphenylene sulfide; block copolymers containing at least of one of the aforementioned constituting at least 40 percent by weight of the copolymer; and blends thereof. The thermoplastic fibers are appreciated to be recycled, virgin, or a blend thereof. The thermofusible thermoplastic matrix fibers have a first melting temperature at which point the solid thermoplastic material melts to a liquid state. The reinforcing fibers may also be of a material that is thermofusible provided their thermofusion occurs at a temperature which is higher than the first melting temperature of the matrix fibers so that, when both fibers are used to create a composite, at the first melting temperature at which thermofusibility of the matrix fibers occurs, the state of the reinforcing fibers is unaffected.

Figure 32:
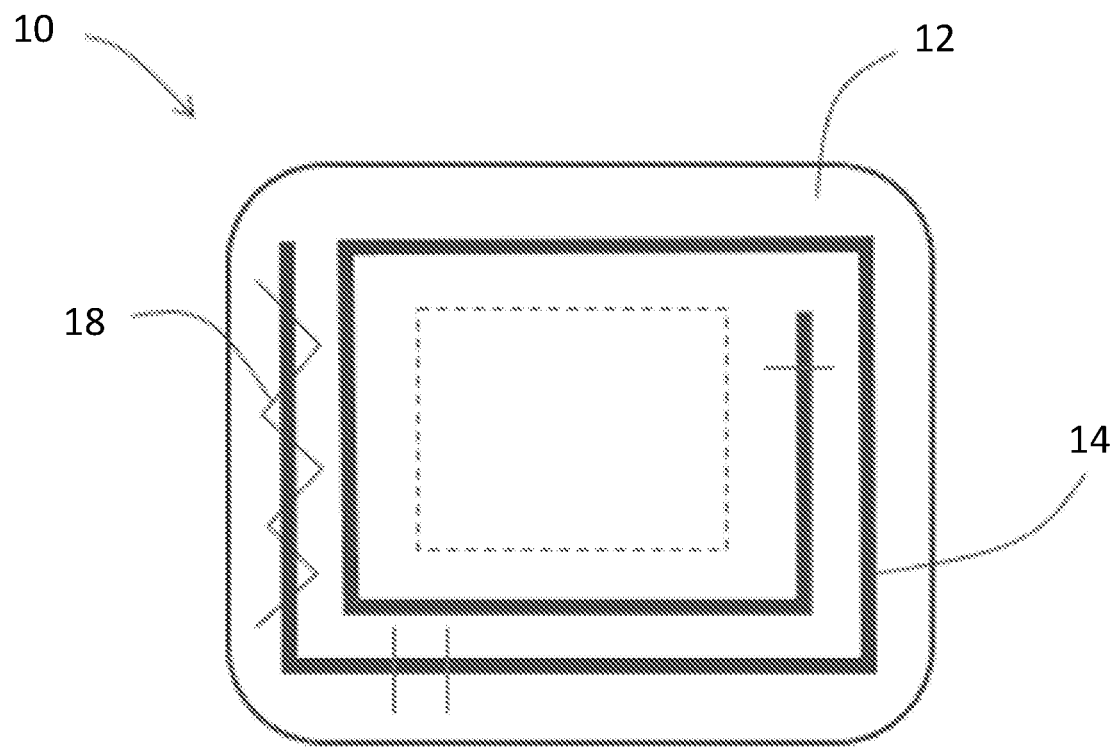
FIG. 32 is a schematic top view of an insert reinforcing preform according to an embodiment of the present disclosure.

As shown in FIG. 32, embodiments in which the fiber bundle 14 is attached to a substrate 12, the substrate acts as a foundation or base upon which a fiber bundle 14 is applied. The substrate 12 may be a tear-off fabric or paper or other suitable material. According to some embodiments, the fiber bundle 14 is applied and attached to the substrate 12 by a plurality of stitches 18 of a thread, which according to some embodiments is a thermoplastic thread, such as nylon. The plurality of stitches 18 are shown in various zig-zag stitch arrangements. For example, the stitches may be closely spaced stitches or spaced apart by a greater linear distance. The stitches may be continuously connected along the fiber bundle 14, or the stitches may be discrete and separate single stitches or separate groups of stitches. The plurality of stitches of thread may also attach the fiber bundle to itself. According to some embodiments, the substrate 12 may be removed completely from the fiber bundle 14 or can be partially removed or cut away prior to placement of the insert reinforcing preform 10 on the core 91. Alternatively, the insert reinforcing preform 10 may be formed without a substrate. In such embodiments, the fiber bundle 14 is attached to itself by a plurality of stitches of a thread, by an adhesive, or by a mechanical fastener. In some embodiments, the insert reinforcing preform 10 is formed directly on the core 91 by arranging the fiber bundle 14 on the core 91. The fiber bundle 14 is arranged along an edge 92*a*-92*d* of the core 91 and attached to the core 91 by a plurality of stitches or thread, by an adhesive, or by at least one mechanical fastener. For example, the adhesive may be hot glue, superglue, a double-sided tape, or a spray adhesive. Examples of mechanical fasteners include staples, binder clips, clips, brads, bobby pins, pins, needles, and paper clips.

For embodiments in which the insert reinforcing preform 10 is formed separately from the core 91, i.e. not formed directly on the core 91, the insert reinforcing preform 10, whether with a substrate or not, is positioned relative to the core 11 prior to being overmolded. Each insert reinforcing preform 10 is positioned along the edge 92*a*-92*d* it is designed to reinforce. According to some embodiments, each insert reinforcing preform 16 is attached to the core 91 by an adhesive, at least one mechanical fastener, or a combination thereof. For example, the adhesive may be hot glue, superglue, a double-sided tape, or a spray adhesive. Examples of mechanical fasteners include staples, binder clips, clips, brads, bobby pins, pins, needles, and paper clips. The mechanical fasteners listed may be formed of, for example, a metal material to provide further reinforcement of the edge or a plastic material. In some embodiments, the plastic material forming the mechanical fastener is a thermofusible thermoplastic that become less viscous when heated, for example during overmolding, to further attach or fuse the insert reinforcing preform 16 to the core 11 and strengthen the associated edge 92*a*-92*d*.

Figure 33:
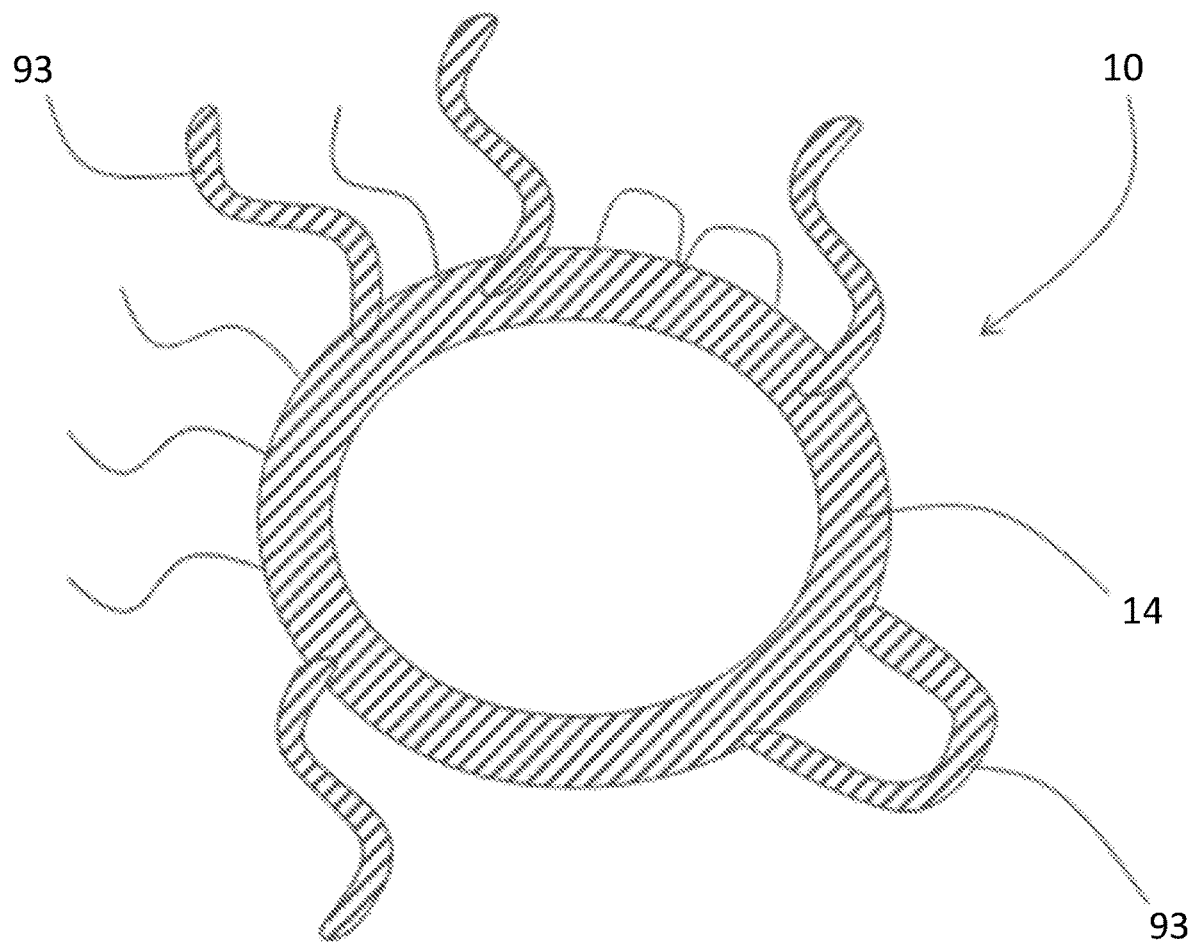
FIG. 33 is a top view of an insert reinforcing preform according to an embodiment of the present disclosure.

As shown in FIG. 33, in some embodiments, the insert reinforcing preform 10 includes a plurality of extensions that extend away from the fiber bundle 14 of the insert reinforcing preform. The extensions 93 are attached to the insert reinforcing preform 10 at the first end of each extension 93. The extensions 93 may be attached to the insert reinforcing preform 10 by stitches of a thread, by an adhesive, or by mechanical fasteners. According to some embodiments, the extensions 93 are dangling portions of the fiber bundle 14 or dangling fibers of the fiber bundle, for example reinforcing fibers or thermofusible fibers of the fiber bundle 14. The extensions 93 may be formed while the insert reinforcing preform is formed, for example by creating loose loops of the fiber bundle 14 as the fiber bundle is arranged, for example on a substrate or on the core 91. The extensions 93 may also be formed by pulling fibers loose from the fiber bundle before, during, or after, the fiber bundle 14 is arranged to form the insert reinforcing preform 10. The extensions 93 may also be formed by attaching them to the fiber bundle 14 after the insert reinforcing preform is formed.

The extensions 93 provide further attachment between the insert reinforcing preform 10 and the core 91 and strengthen the associated edge 92*a*-92*d*. The extensions 93 extend from the insert reinforcing preform onto various sections of the core 91. Depending on the position of the insert reinforcing preform from which the extensions extend, the extensions 93 may extend into corrugations 94 in the core 91, along the core 91 radiating away from through openings 95 or other edge features 92*a*-92*d*. When the vehicle component 90 is overmolded in the resin matrix, the extensions 93 provide more interaction points between the insert reinforcing preform 10 and the core 91. In cases where the extensions 93 include reinforcing fibers, such as those in the fiber bundle 14, the extensions 93 provide increased reinforcement of the vehicle component 90. In cases where the extensions 93 include thermofusible fibers, such as those that may be used in the fiber bundler 14, the extensions 93 provide further points of fusion between the insert reinforcing preform 10 and the core 91.

The present disclosure further provides a method of making the vehicle component described above. In addition to the forming methods described above, the method includes providing the core 91 having the at least one edge 92a-92d, positioning at least one insert reinforcing preform 10 along at least one edge 92a-92d of the core 91; and overmolding the core 91 and the insert reinforcing preform 10 in a resin matrix.

The method may first include giving the core 91 its predesigned shape or geometry, which according to some embodiments includes compression molding a sheet molding compound. According to some embodiments, providing the core includes positioning the core in an overmolding mold. According to embodiments of the present disclosure, the insert reinforcing preform 10 is positioned on the core 91 after the core 91 is positioned in the overmolding mold. Alternatively, the core 91 and insert reinforcing preform 10 may be positioned relative to one another prior to being placed in a mold.

In some embodiments, the method further includes forming an insert reinforcing preform 10. As described above, an insert reinforcing preform is formed by arranging a fiber bundle 14 in a shape corresponding to the edge 92a-92d that the preform is to reinforce. The fiber bundle may be arranged separately from the core 91 or directly upon the core 91. The fiber bundle may be arranged on a substrate 12. Once arranged on the substrate 12 or the core 91, the fiber bundle 14 is attached to itself, the substrate, the core, or a combination thereof. According to some embodiments, the method includes removing the substrate entirely or partially by, for example tearing or cutting at least a portion of the substrate from the insert reinforcing preform, for example along the dotted line shown in FIG. 32.

In further embodiments, the method includes forming extensions that extend from the insert reinforcing preform 10. The extensions 93 may be formed while the insert reinforcing preform is formed, for example by creating loose loops of the fiber bundle 14 as the fiber bundle is arranged, for example on a substrate or on the core 91. The extensions 93 may also be formed by pulling fibers loose from the fiber bundle before, during, or after, the fiber bundle 14 is arranged to form the insert reinforcing preform 10. The extensions 93 may also be formed by attaching them to the fiber bundle 14 after the insert reinforcing preform is formed.

According to embodiments, positioning the insert reinforcing preform 10 on the core 91 includes attaching the insert reinforcing preform 10 to an edge 92a-92d using an adhesive, stitches of a thread, or at least one mechanical fastener. In cases where the insert reinforcing preform 10 includes extensions 93, positioning the insert reinforcing preform 10 on the core 91 includes ensuring that the extensions 93 extend from the insert reinforcing preform either into corrugations 94 of the core 91 or along the core 91.

The foregoing description is illustrative of particular embodiments of the invention, but is not meant to be a limitation upon the practice thereof. The following claims, including all equivalents thereof, are intended to define the scope of the invention.

The invention claimed is:

1. A process of forming a fiber preform, the process comprising:
provide a substrate;
applying a first layer of a fiber bundle to the substrate in a predetermined pattern having a principal orientation;
stitching the first layer of the fiber bundle to the substrate using a thread;
building up subsequent layers of the fiber bundle from the first layer wherein each of the subsequent layers of the fiber bundle is offset from the preceding layer by an angular displacement relative to the principal orientation of the first layer and wherein the first layer and the subsequent layers are all symmetrical about a latitudinal plane parallel to each layer of the fiber preform; and
stitching each of the subsequent layers to a preceding layer using the thread.

2. The process of claim 1 wherein the fiber bundle comprises reinforcing fibers of one of more of carbon fiber, glass fiber, and aramid fiber.

3. The process of claim 1 wherein the fiber bundle is made solely of reinforcing fibers.

4. The process of claim 1 wherein the fiber bundle comprises matrix fibers formed of a thermoplastic material having a first melt temperature below a melting temperature of the thread.

5. The process of claim 1 wherein the thread is a non-melting fiber material of polyaramid, carbon, glass, or a combination thereof or a thermoplastic thread that has a melting temperature.

6. The process of claim 1 further comprising removing the substrate from the fiber preform after each of the subsequent layers is stitched to the preceding layer using the thread.

7. The process of claim 5 further comprising placing the fiber preform on a mold having a shape and heating the fiber preform to the thread melting temperature to melt the thermoplastic thread thereby causing the fiber preform to retain the shape of the mold.

8. The process of claim 1 wherein stitching the first layer of the fiber bundle to the substrate includes stitching using a plurality of stitching heads.

9. The process of claim 1 further comprising creating secondary tack points throughout the first layer of the fiber bundle to attach the fiber bundle to itself by applying hot glue to the fiber bundle as it is arranged on the substrate, spraying on an adhesive to the substrate, the fiber bundle or a combination thereof, ultrasonically welding points throughout the fiber bundle to fuse the fiber bundle to itself, or applying a thermoplastic powder to the fiber bundle and heating the fiber preform such that the thermoplastic powder melts and cures to form the secondary tack points.

10. The process of claim 1 further comprising urging the fiber preform to conform to a three-dimensional shape of a shaping mold and applying a curable material to the fiber preform such that the fiber preform retains the three-dimensional shape of the shaping mold when the material cures.

11. The process of claim 10 wherein urging the fiber preform into conformance with the shaping mold includes placing a shaping guide on the fiber preform to press the fiber preform into the three-dimensional shape of the shaping mold or applying a vacuum to suction the fiber preform into the three-dimensional shape of the shaping mold.

12. The process of claim 10 wherein the curable material is a high strength hair spray, an adhesive, a paint, or a high temperature epoxy.

13. A process of forming a unitary reinforced composite component comprising:
placing a fiber preform onto a mold platen, the fiber preform comprising:
a substrate;
a fiber bundle comprising one or more types of reinforcing fibers;
a thread;

wherein the fiber bundle is arranged on the substrate and attached to the substrate by a plurality of stitches of the thread to form a first preform layer having a principal orientation and wherein the fiber bundle is further built up from the first preform layer to form subsequent layers, wherein each of the subsequent layers of the fiber bundle is offset from the preceding layer by an angular displacement relative to the principal orientation of the first layer and wherein the first layer and the subsequent layers are all symmetrical about a latitudinal plane parallel to each layer of the fiber preform;

heating the perform to promote fusion of the thermoplastic fibers therein;

cooling the perform until solidified with contours of the component; and removing the vehicle component from the mold platen.

14. The process of claim 13 further comprising applying a thermoplastic skin intermediate between the fiber preform and the mold platen.

15. The process of claim 13 further comprising applying a second opposing platen to apply pressure and sandwich the fiber preform.

16. The process of claim 13 wherein the unitary reinforced composite component is a vehicle component.

17. The process of claim 13 wherein placing the fiber preform in the mold includes removing the substrate from the fiber preform.

18. The process of claim 13 further comprising placing at least one sheet of preformed thermoset resin onto the mold platen prior to placing the fiber preform onto the mold platen.

19. The process of claim 13 wherein the component is a vehicle component.

* * * * *